(12) United States Patent
Kasimov

(10) Patent No.: US 9,841,192 B2
(45) Date of Patent: Dec. 12, 2017

(54) STANDING DETONATION WAVE ENGINE

(71) Applicant: KING ABDULLAH UNIVERSITY OF SCIENCE AND TECHNOLOGY, Thuwal (SA)

(72) Inventor: Aslan Kasimov, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 596 days.

(21) Appl. No.: 14/052,301

(22) Filed: Oct. 11, 2013

(65) Prior Publication Data

US 2015/0285506 A1    Oct. 8, 2015

Related U.S. Application Data

(60) Provisional application No. 61/712,972, filed on Oct. 12, 2012.

(51) Int. Cl.
| | |
|---|---|
| *F23R 7/00* | (2006.01) |
| *F02C 5/04* | (2006.01) |
| *F02K 7/02* | (2006.01) |
| *F02K 9/42* | (2006.01) |
| *F02C 5/02* | (2006.01) |

(Continued)

(52) U.S. Cl.
CPC ............... *F23R 7/00* (2013.01); *F02C 5/02* (2013.01); *F02C 5/04* (2013.01); *F02C 7/222* (2013.01); *F02K 7/02* (2013.01); *F02K 9/42* (2013.01); *F02C 5/11* (2013.01); *F02K 7/06* (2013.01); *F05D 2220/32* (2013.01);

(Continued)

(58) Field of Classification Search
CPC .. F23C 15/00; F23R 7/00; F23R 2900/03281; F02K 7/06; F02K 7/00; F02C 5/04; F02C 5/11
See application file for complete search history.

(56) References Cited

U.S. PATENT DOCUMENTS

| | | | | |
|---|---|---|---|---|
| 364,866 | A * | 6/1887 | Seigneuret | F02C 5/04 60/39.15 |
| 1,260,015 | A * | 3/1918 | Noakes | F02C 5/04 60/39.34 |

(Continued)

FOREIGN PATENT DOCUMENTS

| | | |
|---|---|---|
| GB | 2468515 | 9/2010 |
| JP | 2007-107821 | 4/2007 |

(Continued)

OTHER PUBLICATIONS

International Search Report and Written Opinion for PCT/IB2013/003257 mailed Oct. 17, 2014.

(Continued)

*Primary Examiner* — Lorne Meade
(74) *Attorney, Agent, or Firm* — Patent Portfolio Builders PLLC

(57) ABSTRACT

A detonation engine can detonate a mixture of fuel and oxidizer within a cylindrical detonation region to produce work. The detonation engine can have a first and a second inlet having ends fluidly connected from tanks to the detonation engine. The first and second inlets can be aligned along a common axis. The inlets can be connected to nozzles and a separator can be positioned between the nozzles and along the common axis.

15 Claims, 33 Drawing Sheets

(51) Int. Cl.
*F02C 7/22* (2006.01)
*F23C 15/00* (2006.01)
*F02K 7/06* (2006.01)
*F02C 5/11* (2006.01)

(52) U.S. Cl.
CPC .......... *F05D 2240/35* (2013.01); *F23C 15/00* (2013.01); *F23R 2900/03281* (2013.01)

(56) References Cited

U.S. PATENT DOCUMENTS

| | | | | |
|---|---|---|---|---|
| 2,942,412 | A * | 6/1960 | Bollay | F02K 7/06 60/247 |
| 3,061,337 | A * | 10/1962 | Shaw | B23B 31/302 285/121.4 |
| 3,217,491 | A * | 11/1965 | Funk | F02K 7/00 431/1 |
| 3,336,754 | A | 8/1967 | Lange et al. | |
| 3,733,820 | A * | 5/1973 | Andersson | F23C 15/00 60/39.77 |
| 4,642,046 | A * | 2/1987 | Saito | F02K 7/02 431/1 |
| 4,741,154 | A * | 5/1988 | Eidelman | F02C 3/165 415/80 |
| 4,903,480 | A * | 2/1990 | Lee | F02K 7/10 60/740 |
| 5,044,930 | A * | 9/1991 | Hongo | F23C 15/00 431/1 |
| 5,123,835 | A * | 6/1992 | Richards | F23C 15/00 122/24 |
| 5,138,831 | A * | 8/1992 | Cowan, Sr. | F02C 5/04 60/39.34 |
| 6,062,018 | A * | 5/2000 | Bussing | B01J 3/08 60/39.181 |
| 6,464,490 | B1 * | 10/2002 | Chato | F23C 15/00 122/24 |
| 6,584,765 | B1 * | 7/2003 | Tew | B64G 1/401 60/247 |
| 6,938,588 | B2 * | 9/2005 | Jacobsen | F01B 11/00 123/305 |
| 7,310,951 | B2 | 12/2007 | Kasahara | |
| 7,475,914 | B2 * | 1/2009 | Pospisil | F16C 17/26 285/121.3 |
| 2005/0079461 | A1 | 4/2005 | Kawahara | |
| 2010/0150705 | A1 | 6/2010 | Mason et al. | |
| 2012/0192630 | A1 | 8/2012 | Westervelt et al. | |

FOREIGN PATENT DOCUMENTS

| | | |
|---|---|---|
| JP | 2007191550 A | 8/2007 |
| JP | 2012508864 A | 4/2012 |
| JP | 2014171406 A | 9/2014 |
| WO | 2003089773 A1 | 10/2003 |

OTHER PUBLICATIONS

Japanese Notice of Allowance in related Japanese Application No. 2015-536241, dated Aug. 8, 2017.

* cited by examiner

STANDING DETONATION WAVE ENGINE

CLAIM OF PRIORITY

This application claims the benefit of prior U.S. Provisional Application No. 61/712,972, filed on Oct. 12, 2012, which is incorporated by reference in its entirety.

TECHNICAL FIELD

The present invention relates to a standing detonation wave engine.

BACKGROUND

Gaseous detonation waves can propagate in and be influenced by various geometric configurations. In cylindrical rigid tubes, the propagation can be in the form of a multicellular detonation in large-diameter tubes, a spinning detonation in tubes of moderate diameter, and/or galloping detonation in tubes of very small diameter. In channels of rectangular cross sections of various aspect ratios, similar cellular or galloping modes can be also achieved. In between parallel plates, when the gap between the plates is much smaller than the plates' lateral span, a two-dimensional cellular detonation can be achieved because of suppression of transverse waves in the direction normal to the plates. Other configurations are those of detonations stabilized in supersonic flows, which can be relevant to the problem of detonative propulsion and detonation engines.

Detonation combustion is an efficient way to burn a mixture of fuel and air to release chemical energy. The theoretical efficiency of detonation combustion, which is calculated by dividing work output by heat input, is approximately 49%. By comparison, more traditional processes, such as constant volume combustion or constant pressure combustion, have theoretical efficiencies of 47% and 27%, respectively. The enhanced efficiency of detonation combustion is attributed to its unique heat release process, in which burning of the fuel-air mixture occurs tens of thousands of times faster than in conventional combustion, which relies on a propagating flame front. Although more efficient, detonation combustion can also be more difficult to control. For instance, difficulties arise when initiating and sustaining detonation combustion. However, recent advances in engine control technologies allow these difficulties to be overcome.

SUMMARY

A detonation engine and method are provided. The detonation engine can produce a stabilized standing detonation wave. The flow of heated combustion products created by the stabilized detonation wave can be converted into mechanical energy. For example, the detonation engine can have a combustion chamber where the detonation wave is stabilized. The chamber can be partially surrounded by, for example, turbine blades which provide obstacles to limit free expansion of the detonation wave and thereby assist in forming the stabilized standing wave.

In one aspect, a detonation engine can include a first inlet having a first end fluidly connected to a first tank and a second end fluidly connected to a detonation engine, a second inlet having a first end fluidly connected to a second tank and a second end fluidly connected to the detonation engine opposite the first inlet. The first and second inlets can be aligned with a common axis. The detonation engine can further include a first nozzle connected to the first inlet, a second nozzle connected to the second inlet, and a separator positioned between the second end of the first inlet and the second end of the second inlet. The first inlet, the second inlet, and the separator can be positioned along the common axis.

In some embodiments, a detonation engine can include obstacles configured to stabilize detonation in the detonation engine. A detonation engine can include one or more turbines rotatably attached to the detonation engine. A turbine can further include blades configured to stabilize detonation in the detonation engine. The first tank can be configured to receive an oxidizer. The second tank can be configured to receive a fuel. The first nozzle can be proximate the second end of the first inlet. The second nozzle can be proximate the second end of the second inlet. The first nozzle can be disposed within the first inlet. The second nozzle can be disposed within the second inlet.

In another aspect, a method for detonating a mixture of fuel and oxidizer can include introducing an oxidizer to a detonation engine through a first inlet, introducing a fuel to the detonation engine through a second inlet, wherein the first and second inlets can be aligned with a common axis, and detonating a mixture of the fuel and the oxidizer at a distance from the common axis within a cylindrical detonation region. A method can include accelerating the oxidizer through a first nozzle and accelerating the fuel through a second nozzle. A method can include directing the oxidizer against a first side of a separator and radially outward from the common axis and directing the fuel against a second side of the separator, which is opposite the first side, and radially outward from the common axis.

In some embodiments, the first inlet can have a first end fluidly connected to a first tank and a second end fluidly connected to the detonation engine. The second inlet can have a first end fluidly connected to a second tank and a second end fluidly connected to the detonation engine. The first and second inlets can be aligned with a common axis. Accelerating the oxidizer through the first nozzle can produce supersonic flow, and accelerating the fuel through the second nozzle can produce supersonic flow. A method can include expanding combustion products resulting from detonating the mixture through a turbine to produce work. A method can include providing obstacles to inhibit expansion of combustion products resulting from detonating the mixture. A method can include stabilizing detonation of the mixture in the detonation engine. Obstacles can be configured in the detonation engine to achieve stabilization of the detonation. Obstacles can be turbine blades, which can, for example, convert kinetic energy of combustion products into mechanical energy.

Other aspects, embodiments, and features will be apparent from the following description, the drawings, and the claims.

DETAILED DESCRIPTION

Figure 1:
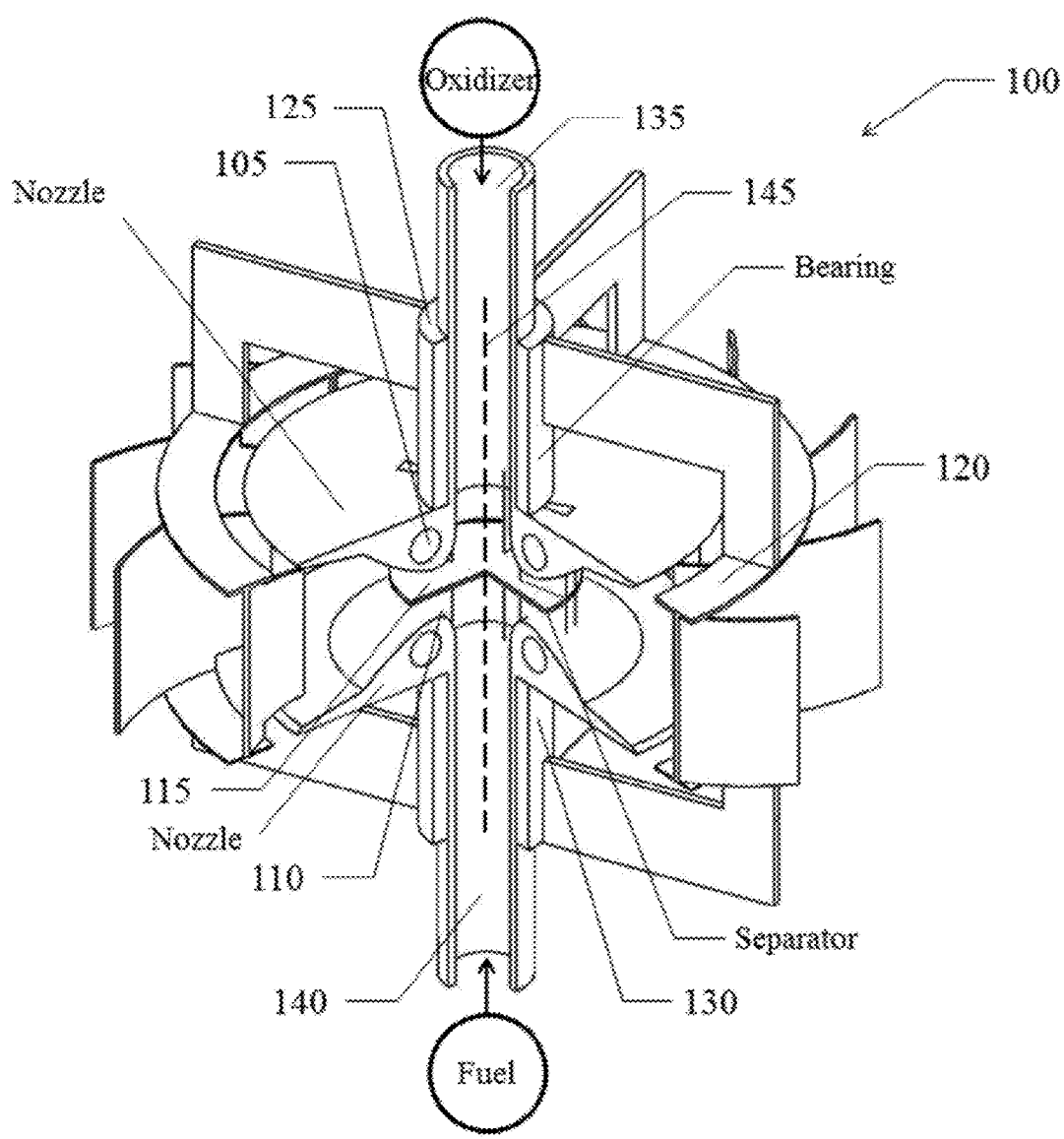
FIG. 1 is a cross-sectional view of a detonation engine.

Achieving a standing detonation wave in an experimental engine can be challenging, but the use of computational models can dramatically improve the likelihood of success. For instance, through an iterative approach, a computational model can enable a researcher to identify effective geometries and boundary conditions without building a series of prototypes. The computational model should account for the laws of conservation, chemical reaction mechanisms, and stability considerations. A detonation wave can be modeled as a shock wave followed by a reaction zone. To simplify the calculations and reduce computation time, the detonation wave can be modeled as a perfect fluid with no change in the molecular weight of the gases. Energy addition can be assumed to occur in a single-step chemical reaction. To further simplify the calculations, heat conduction and viscosity effects can be neglected. The resultant system of two-dimensional reactive Euler equations can be efficiently solved, for example on a parallel computer cluster, in order to test the stable existence of a standing detonation wave.

In a detonation engine, a supersonic flow of a reactive mixture can exit a de Laval nozzle and can form, for example, a Mach disk. The gas compression in the Mach disk can initiate chemical reactions downstream so that a reaction zone forms at some distance from the disk. One of the early experimental studies of this flow configuration was reported, where the authors were able to achieve a standing shock-reaction-zone complex. Even though this configuration resembles that of detonation, it is perhaps more properly called shock-induced combustion rather than detonation, because the Mach disk can exist stably in such flow irrespective of the presence of chemical reactions. The extent to which the reaction zone plays a role in the existence and properties of the Mach disk appears not to have been explored in much detail, to the best of our knowledge.

A supersonic stream of a fuel-air mixture can be generated with the help of high-pressure supply tanks pushing the fuel and oxidizer through, for example, a convergent-divergent nozzle into a test channel. Detonations running with and against the flow were studied and the effect of the flow boundary layers in the channel on the detonation velocity was investigated. Stabilization by variation of the channel geometry was considered numerically using a model with multi-step kinetics for hydrogen-air. They concluded that variations of the channel cross section can be used to stabilize the detonation wave in a channel.

Detonation can also be stabilized in a supersonic flow by a blunt body. In such a configuration, detonation can be stabilized on a wedge in a supersonic stream of a reactive gas. Chemical reactions can begin a distance downstream of the wedge nose and can influence the structure of the shock attached to the wedge. Similarly to the case of reactions downstream of the Mach disk in the de Laval nozzle, the shock in this configuration can exists even in the absence of chemical reactions, i.e. shock-induced combustion.

A detonation can be stabilized in a supersonic flow by fixing its position in the axial direction, but allowing it to rotate in the azimuthal direction. Such a configuration can achieve a continuously spinning detonation. A supersonic stream of air can enter a thin gap between two coaxial cylinders and mix with fuel. The fuel can be injected from, for example, an inner cylinder. The mixture can continuously burn in a rotating detonation wave that propagates in the circumferential direction. This configuration can be used in detonation engines, for example, as an alternative to pulse-detonation engines.

As discussed further below, using the compressible Euler equations for a perfect gas reacting according to the single-step Arrhenius reaction model, existence of a steady-state detonation standing in a supersonic flow radially emanating from a central source can be found. Inflow conditions, such as the stagnation enthalpy of the mixture and the inflow Mach number, in the existence and structure of the steady detonation solution, can play roles in the stability of the detonation wave. Depending on the parameters, one can have either no solution, or one or two solutions of the steady-state problem. In the case of co-existence of two steady solutions, one of the solutions can correspond to a relatively small detonation radius and the other to a large radius. These two types of solutions can have distinctly different structures. The small-radius solution can have a square-wave like structure with a large induction zone of about 100 times the length of the steady planar Zel'dovich-von Neumann-Doring (ZND) solution. In contrast, the large-radius solution has no clear induction zone.

Further, stability of the steady-state solutions can be determined and the dynamics of the detonation computed, for example, by numerically integrating the two-dimensional reactive Euler equations. As initial conditions, both the square-wave like and regular steady solutions are considered below. A fast collapse on the time scales of tens of the steady half-reaction times, and slow expansion, on the scales of hundreds of the same time units, can be obtained. The large-radius solution can lead to a very slowly expanding detonation, in which cellular structures quickly form before any significant expansion takes place. These expanding detonations can be stabilized by placing small rigid obstacles downstream of the steady-state detonation radius, so that a stable cellular detonation establishes at some distance from the center of the source.

Detonation initiation by obstacles by placing the obstacles initially in a non-reacting adiabatic flow of the gas can also be numerically determined. Bow shocks that form around the obstacles, for example, can quickly turn to detonation that starts to expand. With the same obstacles, the same final detonation structure can be obtained in the initiation case.

An embodiment can include a supersonic stream of a combustible mixture. The supersonic stream can flow radially from a circular source and undergo detonative combustion downstream. The flow can be guided between two parallel plates with an outside source of the mixture providing an inflow from the center. High-speed flow conditions at the exit from a source can be generated by rapid expansion through, for example, a nozzle. Detonation in this embodiment can be a self-sustained wave, as the shockwave existence depends on the presence of chemical reactions. Mere adiabatic expansion of the flow would occur in the absence of the chemical reaction.

Governing reactive Euler equations can admit a steady-state solution with a self-sustained detonation standing at some finite distance from the source. The nature of such a solution can be explored by examining the role of various parameters of the problem, such as the mixture properties and the inflow conditions. Using two-dimensional simulations, the nonlinear dynamics of the detonation can be investigated, for example its stability. The detonation is generally unstable, and the instability exhibits itself not only in the form of cell formation, but also in the form of an overall radial contraction and expansion of the detonation front. Expansion can be prevented, for example, by putting several rigid obstacles in the flow downstream.

In the absence of chemical reactions, a two-dimensional radially-symmetric supersonic flow of an ideal combustible gas emanating from a circular source of a given radius the flow is adiabatic and, since it is also supersonic, during the expansion, the flow speed and the Mach number increase, while the pressure, temperature, and density all decrease with distance. These features can be established from equations of gas dynamics, as will be shown below. Using analysis, for example, within the framework of the Zel'dovich-von Neumann-Doring (ZND) theory, conditions under which a steady radially symmetric detonation wave can exist in an adiabatic radially expanding flow can be determined. Using numerical solutions, for example of two-dimensional reactive Euler equations with a single-step Arrhenius kinetics, the stability of such a steady structure to two-dimensional perturbations can be shown.

Figure 5:
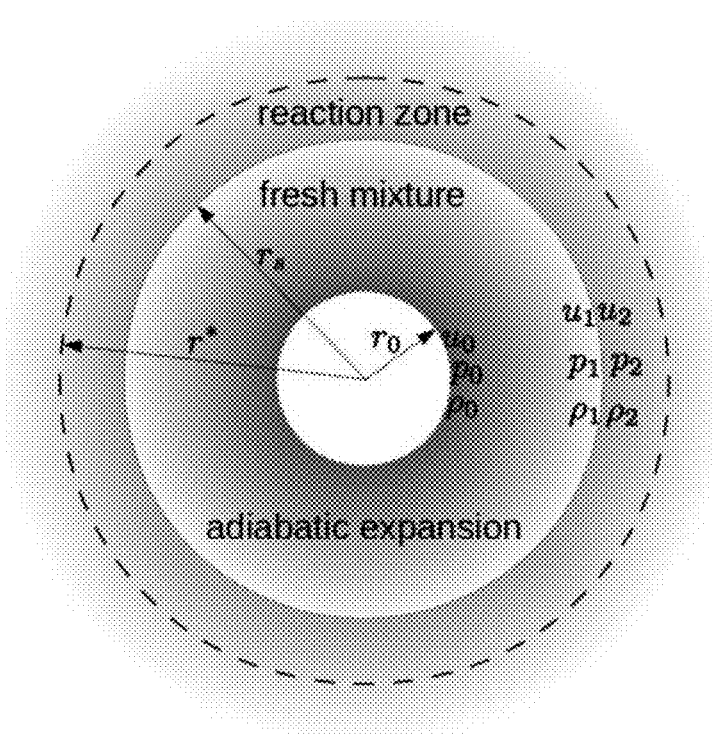
FIG. 5 depicts the geometry of a standing detonation in a radially expanding flow.

The schematic geometry of a standing detonation in a radially expanding flow is shown in FIG. 5. A central source has a radius $r_0$ from which the reactive gas emanates at initial flow conditions given by pressure $p_0$, density $\rho_0$, and flow velocity $u_0$. Since the flow accelerates during supersonic expansion, at some distance $r_s$, the flow conditions can become such that a standing detonation wave structure can be established downstream of $r_s$. The state in front of the detonation shock is $\rho_1$, $p_1$, $u_1$, and the state immediately behind the shock is $\rho_2$, $p_2$, $u_2$. For the standing detonation, its velocity D should be the same as $u_1$. Behind the shock, there is a sonic locus at $r=r_*$, where the flow velocity is equal to the local sound speed, $u_*=c_*$.

As discussed below, such a standing detonation structure can exist under wide range of conditions. Moreover, the coexistence of multiple solutions at the same inflow conditions can be possible.

If the temperature of the gas emanating from the source is sufficiently low, and since it decreases during the expansion, the flow from the source can be considered as adiabatic and reactions can be neglected. The detonation radius, $r_s$, is unknown a priori, but can be determined, for example, by matching the upstream state with the Rankine-Hugoniot conditions and the flow conditions downstream of the detonation shock. An important ingredient of such a detonation structure is the existence of a sonic point behind the shock. Because the flow velocity immediately behind the shock is subsonic and the flow of the products far enough from the shock is supersonic, it follows that at some distance from the source, $r_*>r_s$, the flow velocity equals the local speed of sound.

The velocity of gaseous detonation is usually an order of a few kilometers per second and to keep such detonation at a fixed distance, the initial energy of the flow can be made sufficiently high. The total energy of the initial flow that is necessary to establish the standing detonation can be estimated. Assuming no friction losses, the total enthalpy of the flow, $$H = \frac{\gamma}{\gamma-1}\frac{RT}{W} + \frac{u^2}{2}, \qquad (1)$$

is a conserved quantity. Here T is the temperature of the flow, u is the flow velocity, W is the mixture molar mass and R is the universal gas constant. During the adiabatic expansion, the temperature of the flow can decrease, and therefore the flow velocity can increase. Even if all of the potential energy of the flow converts to the kinetic energy, the flow cannot be faster than $\sqrt{2H}$. On the other hand, the detonation velocity has a lower limit, which can be estimated. Assuming that radius of the converging detonation is much bigger than the size of the reaction zone, the detonation curvature effects can be neglected and the detonation velocity can be approximated as $D_{CJ}=\sqrt{\gamma RT/W+0.5Q(\gamma^2-1)}+\sqrt{0.5Q(\gamma^2-1)}$, where T is the ambient temperature ahead of the detonation shock. Thus the detonation velocity is always greater than $\sqrt{2Q(\gamma^2-1)}$. To keep the detonation at a fixed distance, the ambient flow should accelerate to the detonation velocity, and hence the condition for the initial flow energy can be written as $H>Q(\gamma^2-1)$.

Reactive Euler Equations

A two-dimensional compressible reactive ideal gas can be assumed to be described by the system of reactive Euler equations, consisting of equations of conservation of mass, momentum, and energy, and of chemical reaction, $$\frac{\partial \rho}{\partial t} + \nabla \cdot \rho \vec{u} = 0, \qquad (2)$$

$$\frac{\partial \rho \vec{u}}{\partial t} + \nabla \cdot (p\vec{I} + \rho \vec{u} \otimes \vec{u}) = 0 \qquad (3)$$

$$\frac{\partial \rho \varepsilon}{\partial t} + \nabla \cdot (\rho \vec{u}(\varepsilon + p/\rho)) = 0 \qquad (4)$$

$$\frac{\partial \rho \varepsilon}{\partial t} + \nabla \cdot (\rho \vec{u} \lambda) = \rho \omega(p, \rho, \lambda), \qquad (5)$$

where $\omega$ ($p$, $\rho$, $\lambda$) is a reaction rate, which can be assumed to be described by a simplified model of the form Reactant→Product, with the rate given by $$\omega = k(1-\lambda)\exp\left(-\frac{E\rho}{p}\right), \qquad (6)$$

where E is the activation energy, $\rho$ is the density, p is the pressure, k is the reaction rate constant, and $\lambda$ is the reaction progress variable. The mass fraction of the reactant is $1-\lambda$ and mass fraction of the product is $\lambda$, where $\lambda=0$ corresponds to the fresh mixture and $\lambda=1$ to the fully burnt gas. The equation of state is given by.

$$e_i = \frac{1}{\gamma-1}\frac{p}{\rho} - \lambda Q, \qquad (7)$$

where $\gamma$ is the constant ratio of specific heats. The total energy in (4) is then defined as $\epsilon = e_i + \vec{u}^2/2$.

Shock Conditions

The Rankine-Hugoniot jump conditions are $$-D[\rho] + [\rho \vec{u}_n] = 0, \quad (8)$$

$$-D[\rho \vec{u}_n] + [p + \rho \vec{u}_n^2] = 0, \quad (9)$$

$$-D[\rho \epsilon] + [u_n(\rho \epsilon + p)] = 0, \quad (10)$$

$$-D[\rho \lambda] + [\rho h_n \lambda] = 0, \quad (11)$$

where D is the normal component of the shock speed and $u_n$ is the normal component of the flow velocity. As usual, the shock itself is non-reactive, hence (11) is satisfied trivially. For the steady-state detonation, the detonation velocity is equal to the ambient flow velocity, i.e. $D = u_1$, so that in the laboratory frame of reference the detonation is stationary. For the circular steady-state solution, the flows are perpendicular to the shock surface, therefore for the ideal gas, the Rankine-Hugoniot conditions can be written as:

$$\rho_1 u_1 = \rho_2 u_2, \quad (12)$$

$$p_2 + \rho_2 u_2^2 = p_1 + \rho_1 u_1^2 \quad (13)$$

$$\frac{\gamma}{\gamma-1}\frac{p_1}{\rho_1} + \frac{u_1^2}{2} = \frac{\gamma}{\gamma-1}\frac{p_2}{\rho_2} + \frac{u_2^2}{2}, \quad (14)$$

where $\rho_1, u_1, p_1, \rho_2, u_2, p_2$ are the pre-shock and post-shock density, velocity and pressure, respectively. From these equations, the post-shock state can be written explicitly in terms of the pre-shock state.

As discussed below, the steady-state system can be reduced to two ODEs (ordinary differential equations), for u and $\lambda$, and two conservation laws, for the total energy and mass. By assuming that the reaction rate is zero in the upstream flow, the Rankine-Hugoniot conditions only for the flow velocity can be used, which take a very simple form:

$$u_1 u_2 = 2\frac{\gamma-1}{\gamma+1}H, \quad (15)$$

where $H = \gamma p_0 / ((\gamma - 1)\rho_0) + u_0^2/2$ is the total energy at the source, which in the steady state is conserved along the flow.

Dimensionless Equations and the Choice of Parameters

In problems where detonation propagates into a quiescent state of constant parameters, it is natural to scale the variables with respect to that constant state or with respect to the post-shock state. The detonation can stand or propagate in a non-uniform medium and, thus, the best choice of scales is not immediately apparent. A reference pressure $p_a$, reference density $\rho_a$, temperature $T_a = W p_a/\rho_a$, and velocity $u_a = \sqrt{p_a/\rho_a}$ can be chosen. These can be taken as corresponding to 1 atm and 300K. Generally independent of the specific choice of such reference state, and with the choice of length and time scales as explained below, the governing equations can retain their form.

The remaining scales are the length scale, for which can be chosen a half-reaction-zone length $l_{1/2}$, for a planar detonation that propagates into the above reference state, and the time scale $t_{1/2} = l_{1/2}/u_a$. For a given set of reaction parameters Q, E, and $\gamma$, setting these scales amounts to fixing the rate constant by the integral, $$k = \int_0^{\frac{1}{2}} \frac{U(\lambda)\,d\lambda}{(1-\lambda)\exp(-E/T(\lambda))} d\lambda, \text{ where}$$

$$U(\lambda) = \frac{1}{\gamma+1}\left[\gamma(D_{CJ} + D_{CJ}^{-1})^2 - 2(\gamma^2-1)\left(\frac{\gamma}{\gamma-1} + \frac{1}{2}D_{CJ}^2 + Q\lambda\right)\right],$$

$$T(\lambda) = \frac{\gamma-1}{\gamma}\left(\frac{\gamma}{\gamma-1} + \frac{1}{2}D_{CJ}^2 + Q\lambda - \frac{1}{2}U(\lambda)^2\right), \text{ and}$$

$$D_{CJ} = \sqrt{0.5(\gamma^2-1)Q} + \sqrt{\gamma + 0.5(\gamma^2-1)Q}.$$

Thus in calculations below, the length and time scales can be determined by k, which varies depending on the values of Q, E, and $\gamma$ based on the dimensionless upstream state of $p=1$, $\rho=1$, and $T=1$.

Steady State Radially Symmetric Solution

In the steady radially symmetric case, the equations of motion become:

$$\frac{1}{r}\frac{d}{dr}(r\rho u) = 0, \quad (16)$$

$$\frac{d}{dr}(p + \rho u^2) + \frac{\rho u^2}{r} = 0, \quad (17)$$

$$\frac{1}{r}\frac{d}{dr}(r\rho u(\varepsilon + p/\rho)) = 0, \quad (18)$$

$$\frac{1}{r}\frac{d}{dr}(r\rho u \lambda) = \rho \omega(p, \rho, \lambda), \quad (19)$$

These equations can be reduced to ODEs for u and $\lambda$, $$\frac{du}{dr} = \frac{(\gamma-1)Q\omega - uc^2/r}{c^2 - u^2}, \quad (20)$$

$$\frac{d\lambda}{dr} = \frac{\omega}{u}, \quad (21)$$

while the mass and enthalpy are conserved quantities:

$$r\rho u = M = \text{constant}, \quad (22)$$

$$\frac{c^2}{\gamma-1} - \lambda Q + \frac{u^2}{2} = H = \text{constant}. \quad (23)$$

Here $c = \sqrt{\gamma p/\rho}$ is the local speed of sound, r is the radial coordinate and M is the mass flux. In the computations below, equations 20 and 21 can be rewritten as an autonomous system of three equations where the unknowns are parameterized by $\tau$, $$\frac{du}{d\tau} = u\frac{(\gamma-1)Q\omega - uc^2/r}{c^2 - u^2}, \frac{dr}{d\tau} = u, \frac{d\lambda}{d\tau} = \omega. \quad (24)$$

This system and two conservation laws for the mass and enthalpy (equations 22 and 23) together with the boundary conditions at the source and the far field and the shock condition (equation 15) can fully determine the standing detonation structure. The ambient state, which is between the source and the detonation shock, is in an adiabatic expansion. The steady state equations can reduce to one algebraic equation, for example, for the flow velocity:

$$r = r_0 \frac{u_0}{u}\left(\frac{H - u_0^2/2}{H - u^2/2}\right)^{1/(\gamma-1)} \quad (25)$$

where $r_0$ is the radius of the source and $u_0$ is the flow velocity at the source.

The form of equation (20), wherein there is a possibility of a sonic point in the flow, where u=c, and a possibility of regularization by setting the numerator of equation (20) to zero at the same point, can give the existence condition for the solution. In principle, the solution procedure requires one to find the whole structure for given inflow conditions. However, neither the shock location, nor the location of the sonic point can be directly calculated. One needs an iterative procedure to determine the latter.

Since the sonic point is a saddle point, it can be numerically more robust to find the solution in the neighborhood of the sonic point as a Taylor series expansion, then step away from it and continue integrating by a regular numerical method. The sonic-point position can be unknown explicitly. Fixing boundary conditions at the source, system of equations (24) has one guessing parameter at the sonic point. It can be the radius of the sonic point $r_*$, radius of the detonation $r_s$, or the value of the reaction progress variable at the sonic point $\lambda_*$. To satisfy the boundary conditions at the source, one can scan one of these parameters, for example $\lambda_*$.

To illustrate the algorithm, suppose the source has radius, $r_0$, the flow at the source has pressure $p_0$, density $\rho_0$ and supersonic flow velocity $u_0 > c_0$. Once the flow at the source is known, one can calculate H and M, which are conserved in the whole domain. Since H is fixed, one can write the expression for the radius of the sonic point $r_*$, as a function of $\lambda_*$ by setting the numerator of (24)(a) to zero and using $c_* = u_*$:

$$r_*(\lambda_*) = \frac{c_*^3}{(\gamma-1)\omega_* Q}, \quad (26)$$

where the reaction rate and the speed of sound depend only on $\lambda_*$ through the following expressions:

$$\omega_* = \omega(\lambda_*) = k(1-\lambda_*)\exp(-\gamma E/c_*^2), \quad (27)$$

$$c_* = c(\lambda_*) = u_* = \sqrt{\frac{2(\gamma-1)(H+\lambda_* Q)}{\gamma+1}}. \quad (28)$$

The value of $\lambda_*$ can be a guessing parameter in this algorithm. By scanning it, for example between 0 and 1, the initial conditions at the source can be satisfied. If $\lambda_*$ is found in this process, since H is known, one can integrate the system of equations (24) up to a point, where the mixture becomes fresh $\lambda(\tau_s)=0$. This point can define the beginning of the reaction zone, which is the post-shock state. Therefore, the radius of the jump is given by $r_s=r(\tau s)$. Subsequently, applying the jump condition (15), one can easily get the state ahead of the shock and all the adiabatic profiles by evaluation of equation (25).

The steady state detonation solution may exist only for a certain range of the initial parameters at the source. Considering the scanning procedure from another point of view, H can be assumed to be fixed. Then, solving equation (24) for the range of values of the reaction progress variable at the sonic point, $0 < \lambda_* < 1$, can give the dependence of the post-shock flow velocity on the detonation radius, $u_2^d(r_s)$. This function is monotonically decreasing and convex. The same dependence can be calculated for the adiabatic expansion using equations (25) and (15). The latter curve is also convex and monotonically decreasing, but it contains one additional parameter, the initial flow velocity at the source $u_2^a(r_s, u_0)$. Adjusting $u_0$, the adiabatic curve, $u_2^a(r_s, u_0)$, can be shifted with respect to the detonation curve, $u_2^d(r_s)$. At some values of the initial flow velocity, the curves intersect, implying existence of a solution. These curves may have up to two intersection points, which gives the existence of multiple steady-state solutions for the particular flow at the source. The absence of intersection points means non-existence of a steady solution to the problem.

Figure 6A:
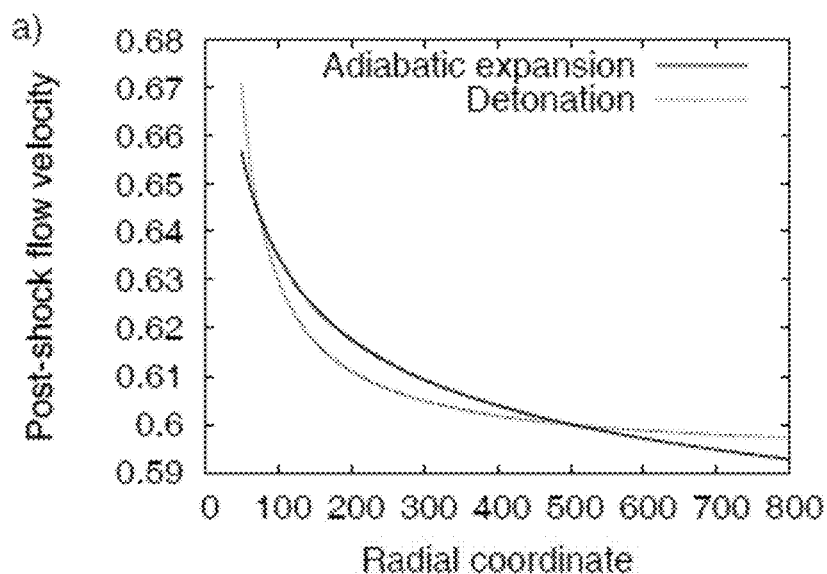
FIGS. 6A-6C depict position-speed curves of an adiabatic expansion and a detonation shock wave.
Figure 6B:
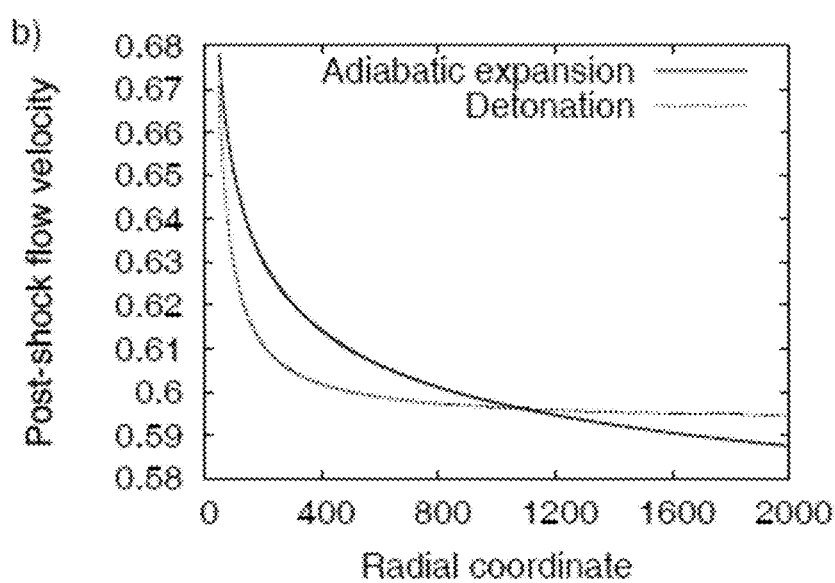
Figure 6C:
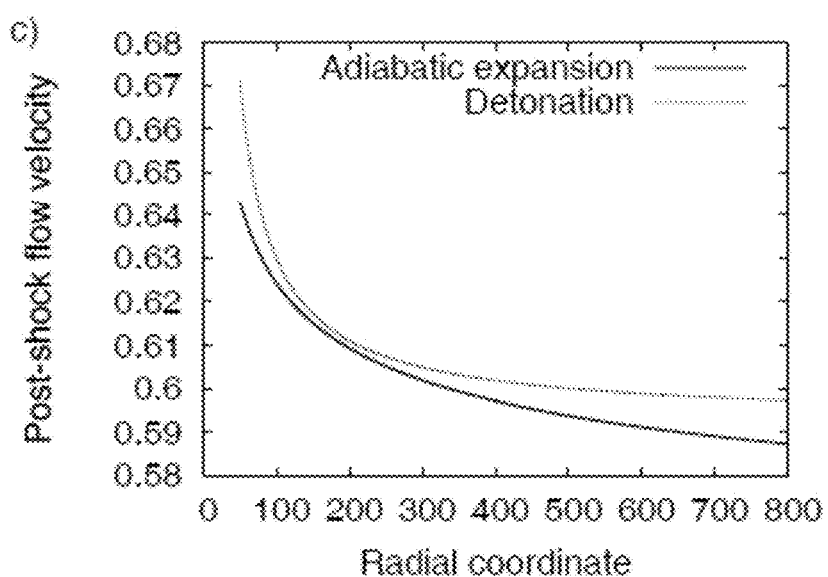

Three conditions are shown in FIGS. 6A-6C. Position-speed curves of an adiabatic expansion and a detonation shock wave are shown where the curves, $u_2^d(r_s)$, and $u_2^a(r_s, u_0)$, have two intersections (a), one intersection (b), and no intersections (c). The parameters of the mixture were chosen to be: $\gamma=1.2$; E=40; Q=30; H=1.3$H_{min}$; and $r_0=50$. In FIG. 6A $M_0=4.40$, (b) $M_0=4.0$, and (c) $M_0=4.67$.

An important consequence of the discussion above is that the radius of detonation for a particular mixture can depend only on two parameters: the value of the total enthalpy of the flow and the value of the initial flow velocity. At some values of these parameters the solution may not exist and at other values, one or two solutions are possible.

Existence and Structure of the Steady-State Solution

It can be important to identify when the solution exists and, if it does, where the detonation is located. The mixture properties and inflow conditions at the source can play a role in the structure of the steady-state solution.

Figure 7A:
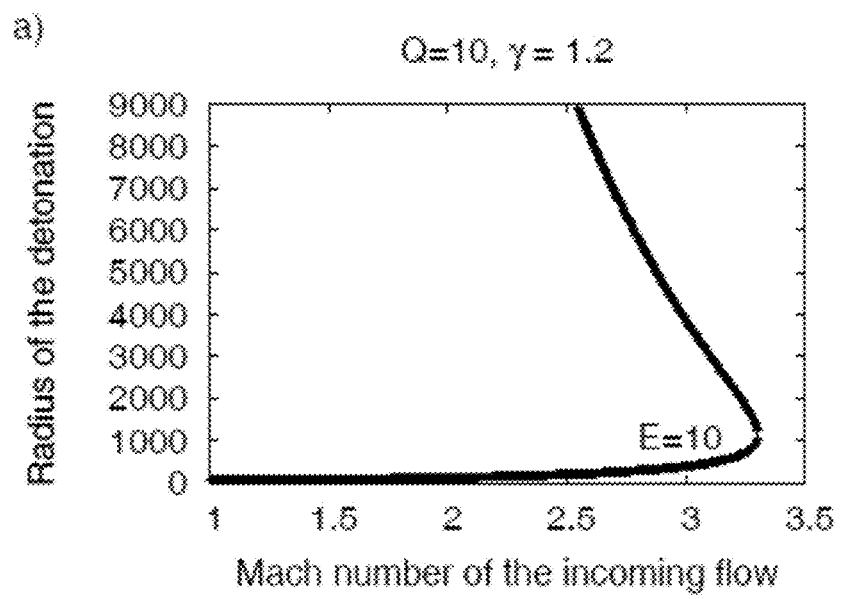
FIGS. 7A-7I depict radii of detonations as a function of incoming flow, given in Mach numbers.
Figure 7B:
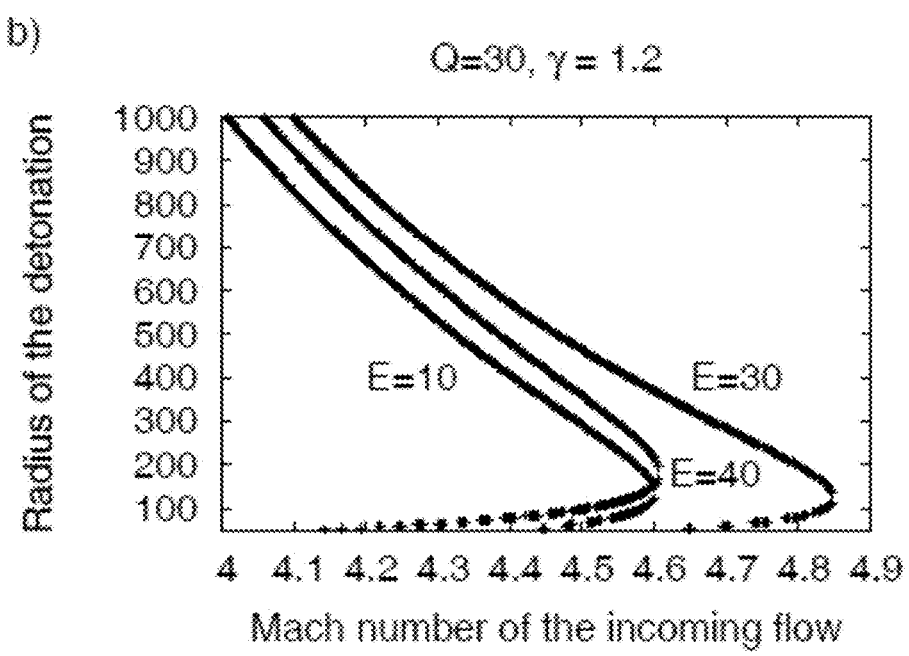
Figure 7C:
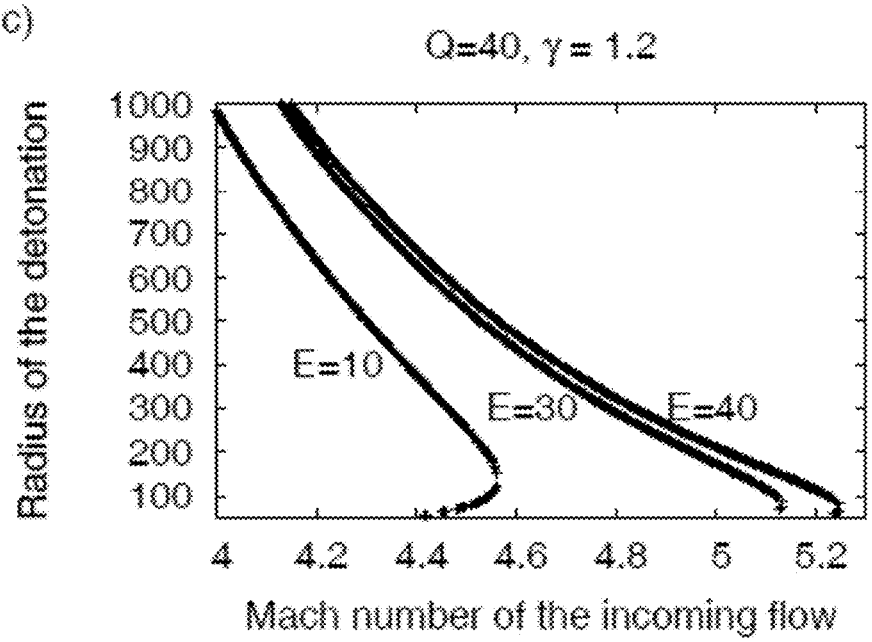
Figure 7D:
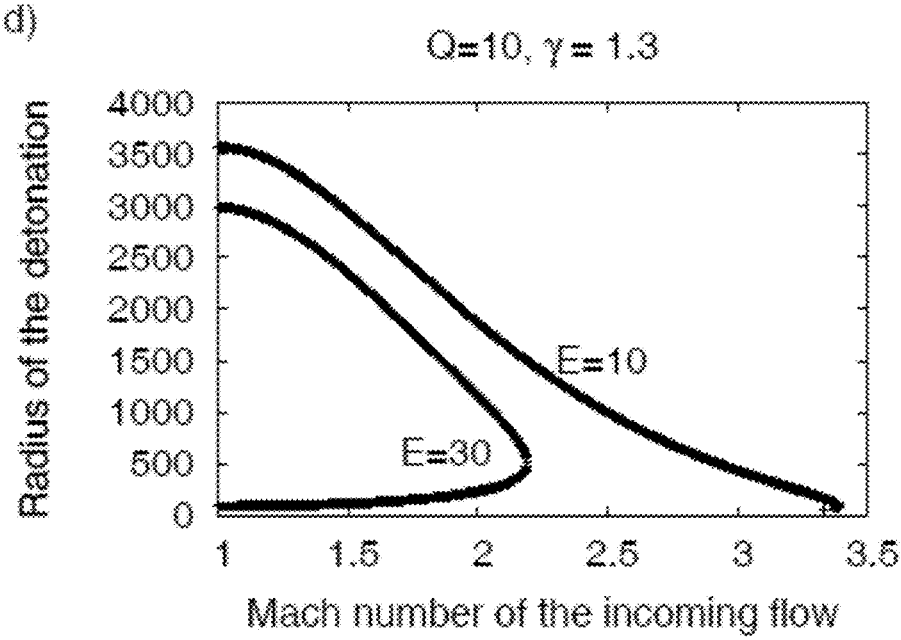
Figure 7E:
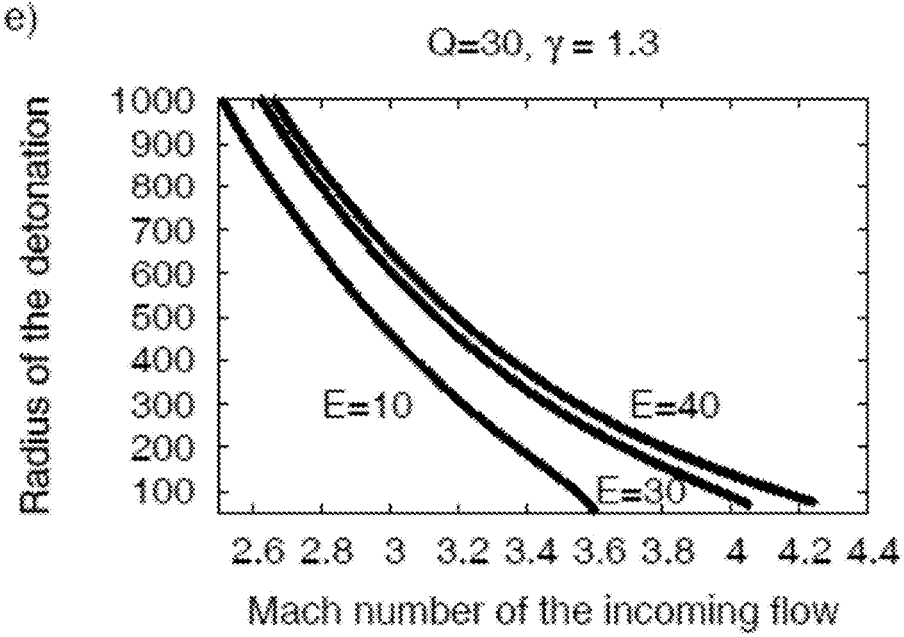
Figure 7F:
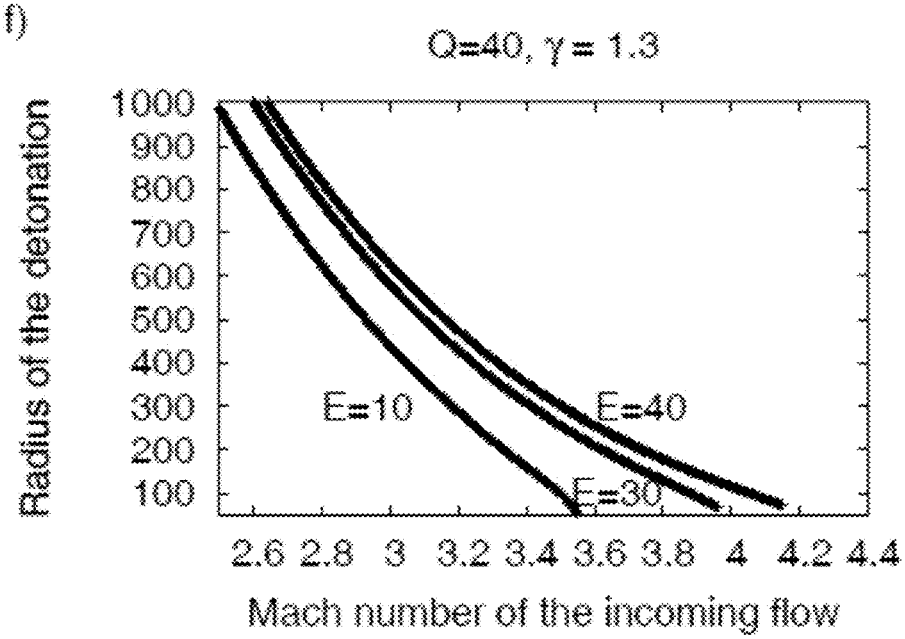
Figure 7G:
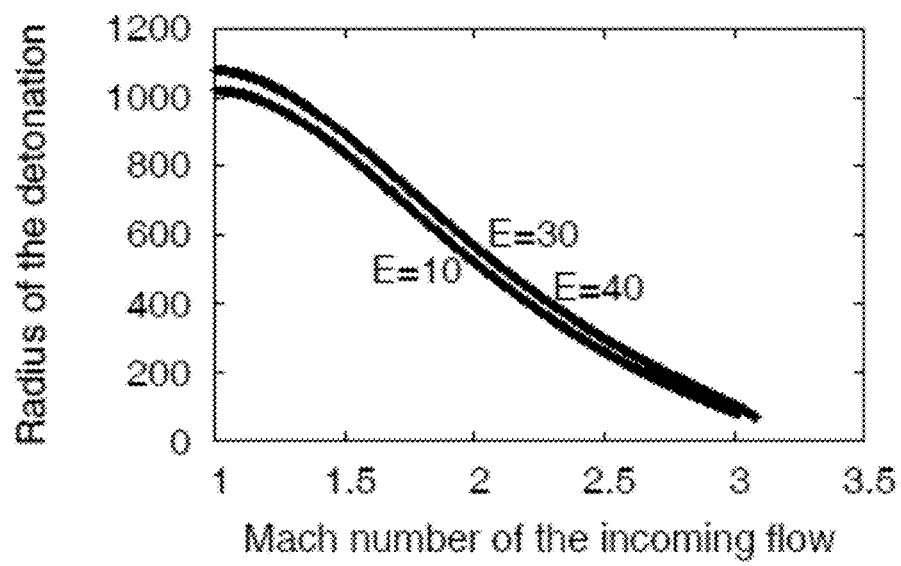
Figure 7H:
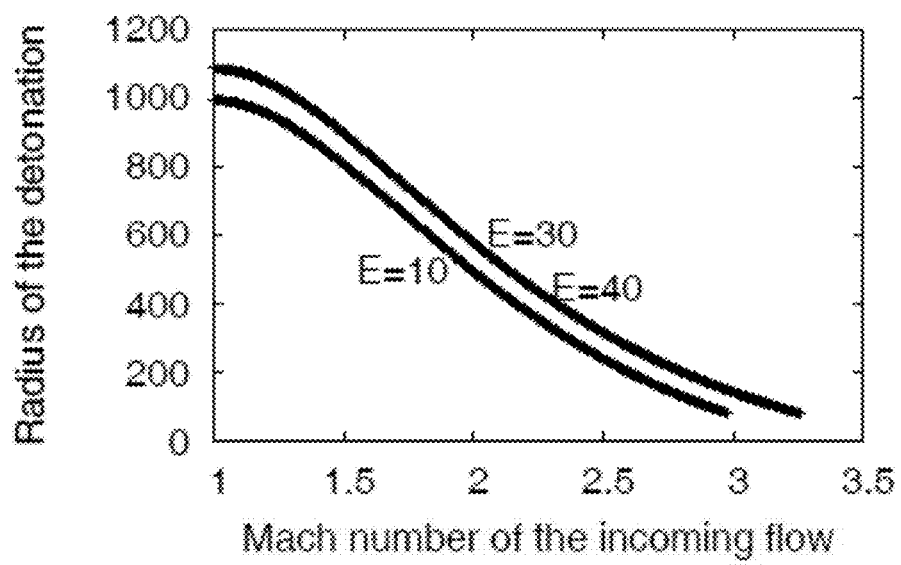
Figure 7I:
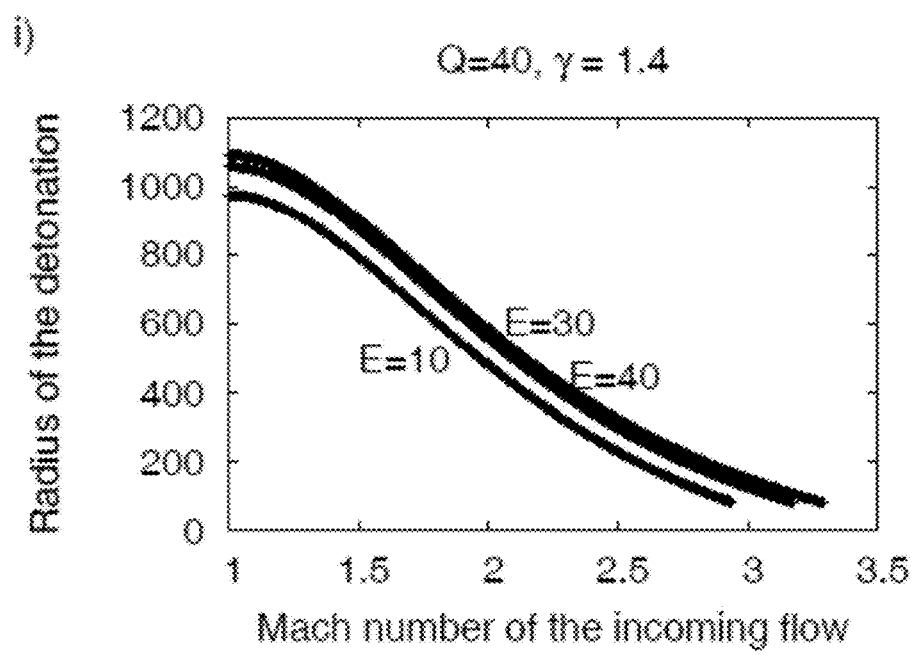

FIGS. 7A-7I depict radii of detonations as a function of incoming flow, given in Mach numbers. The detonation radius is given as a function of the source-flow Mach number $M_0$ for various E, Q, and $\gamma$. The radius of the source is $r_0=50$, and stagnation enthalpy H=1.3$H_{min}$=1.3Q($\gamma^2$-1). FIGS. 7A-7I show how the incoming flow Mach number can affect the detonation radius at a fixed radius of the source and a fixed value of the stagnation enthalpy. The figures also display the role played by the activation energy E, heat release Q, and the specific-heat ratio $\gamma$. The existence of a relatively small radius and a relatively large radius is typical in these figures. At $\gamma=1.2$, the increasing Q requires larger values of $M_0$ in order to achieve a stationary solution. At the same time, the upper radius decreases by an order of magnitude from more than 9000 to about 1000 when Q is changed from 10 to 30. This can indicate that the incoming flow Mach number is large enough; it is feasible to have a detonation whose radius is about a factor of 1000 larger than the size of the reaction zone. Increasing $\gamma$ has an interesting effect of not only reducing the upper radius of detonation to about the same factor of 1000 reaction zones, but also reducing the incoming flow Mach number significantly, from about 3-5 for $\gamma=1.2$ down to 1-3. The effect of the activation energy can be non-monotone, i.e. as the activation energy is increased, the detonation radius can first increase and then decrease. An interesting case is represented by FIG. 7D at E=30. Even at the source Mach number of 1, there exist two solutions, the lower radius being about $r_s=100$ and the upper about 3000.

If the mixture enthalpy H, is small, i.e. close to the minimum value of $H_{min}=Q(\gamma^2-1)$, then the energy is insufficient to speed up the flow to high speeds even all the way to infinity. Then the top branch of the $r_s(M_0)$ curve is absent, but the bottom branch still exist. If on the other hand, H is very high, the top branch is feasible, but the bottom branch disappears, the reason being that the corresponding radius becomes smaller than the source radius. These are the reasons for the absence of the bottom branch on some of the figures in FIGS. 7A-7I.

Figure 8:
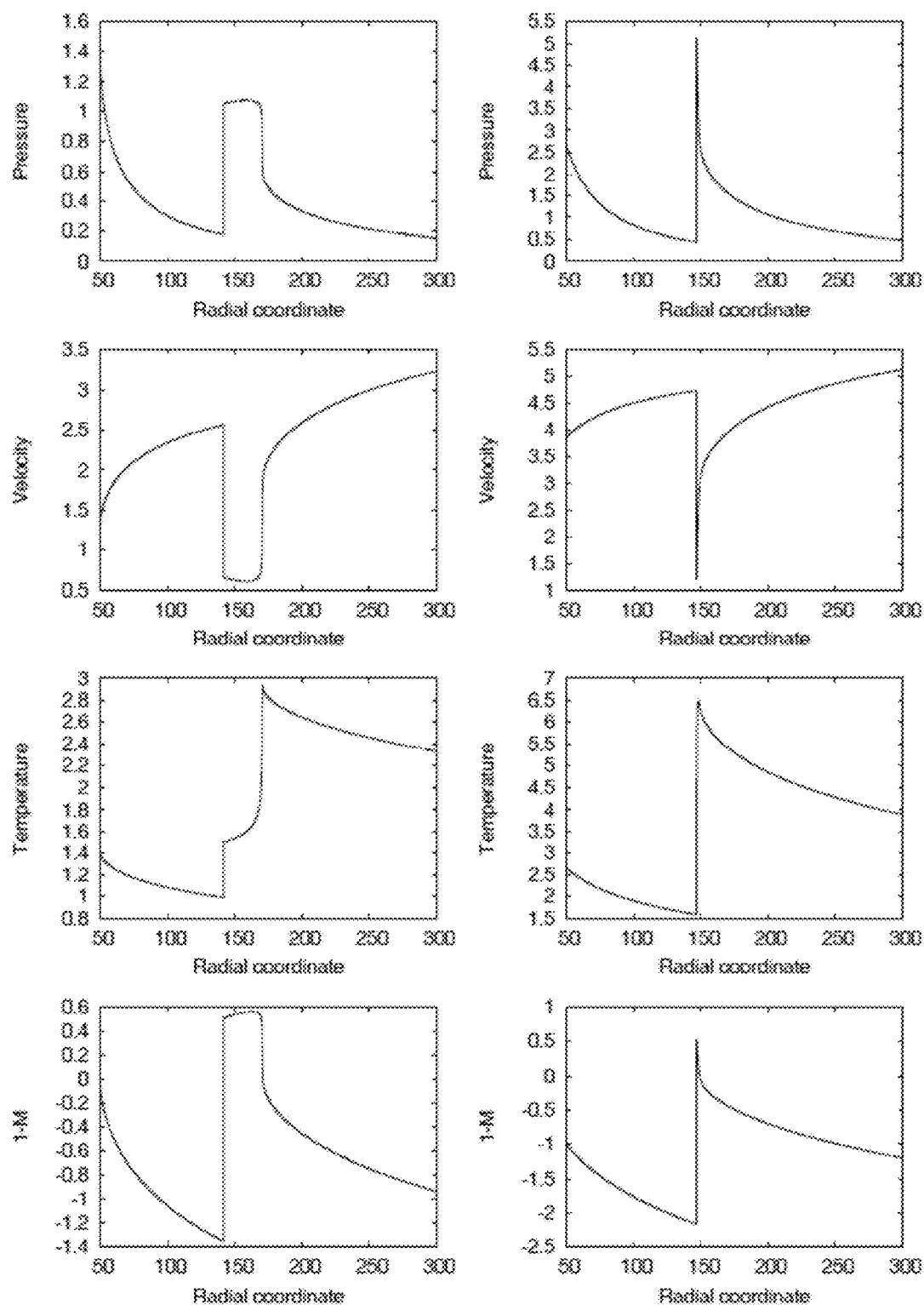
FIG. 8 depicts exemplary steady detonation profiles.

It is of interest to explore the structure of the steady-state solutions corresponding to the upper and lower solutions shown in FIGS. 7A-7I. In FIG. 8, the profiles are plotted of p, u, T, and 1−M that correspond to the lower solution (the left column) and to the upper solution (right column) at similar flow conditions. For both of them the solution is of a square-wave shape.

The left column corresponds to the square wave detonation on a lower branch of $r_s$-M curve, when two branches exist. The parameters for the left column are: $\gamma=1.2$, $Q=10$, $E=30$, $r_0=50$, $\rho_0=1$, $p_0=1.40$, $u_0=1.30$, $M_0=1.0$, $H=2.1H_{min}$. For the right column, only the upper branch exists. The parameters for the right column are: $\gamma=1.4$, $Q=10$, $E=30$, $r_0=50$, $\rho_0=1$, $p_0=2.70$, $u_0=3.90$, $M_0=2.0$, $H=1.75H_{min}$.

A distinctive feature of the solution shown on the left is a square-wave like structure with a rather long reaction zone. The profiles of pressure, temperature, velocity, and Mach number are seen to exhibit almost constant states behind the shock until a thin region of the energy release. There is an induction zone that extends approximately 30 length units. Subsequently, all of the energy can be released over the distance of a few length units. In contrast, the structure for the upper solution displays no induction zone, and the reaction zone is sharp spanning only few length units. The mixture properties for these two cases are the same, however, the inflow conditions were chosen differently so as to place the detonation at about the same distance from the origin. Therefore, for the same mixture, inflow conditions can be modified so that two very different standing detonations can exist at the same radius. Their stability is a deciding factor in whether such detonations exist or not.

In the preceding calculations, the inflow enthalpy was fixed and the role of mixture parameters and the inflow Mach number was explored. The effect of the inflow enthalpy and the inflow Mach number on the detonation radius, for a given mixture, is discussed below. A result is displayed in FIG. 9.

Figure 9:
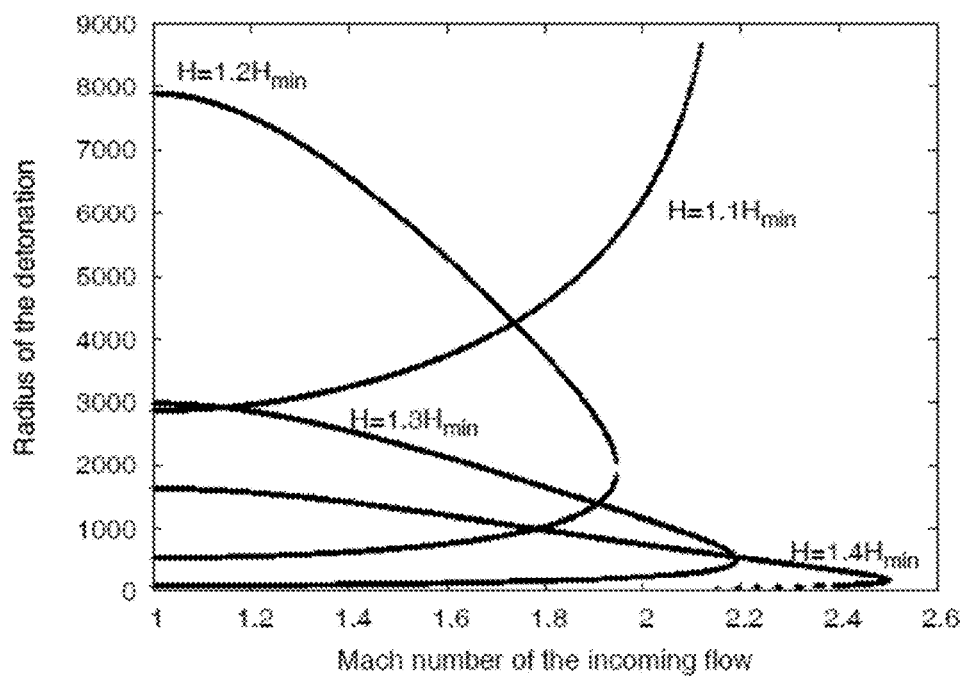
FIG. 9 depicts a radius of an exemplary detonation as a function of initial flow.

FIG. 9 shows the radius of detonation as a function of the initial flow Mach number for different values of the stagnation enthalpy H. The mixture parameters are: $\gamma=1.3$, $Q=10$, $E=30$. The radius of the source is $r_0=50$. By increasing the mixture enthalpy the upper solution can approach lower values of the detonation radius. The radius of the lower solution can also be decreased as H is increased. This result is consistent with the expectation that the higher enthalpy of the flow, the easier it can be to accelerate it to velocities necessary to establish a steady detonation in the flow.

Figure 10:
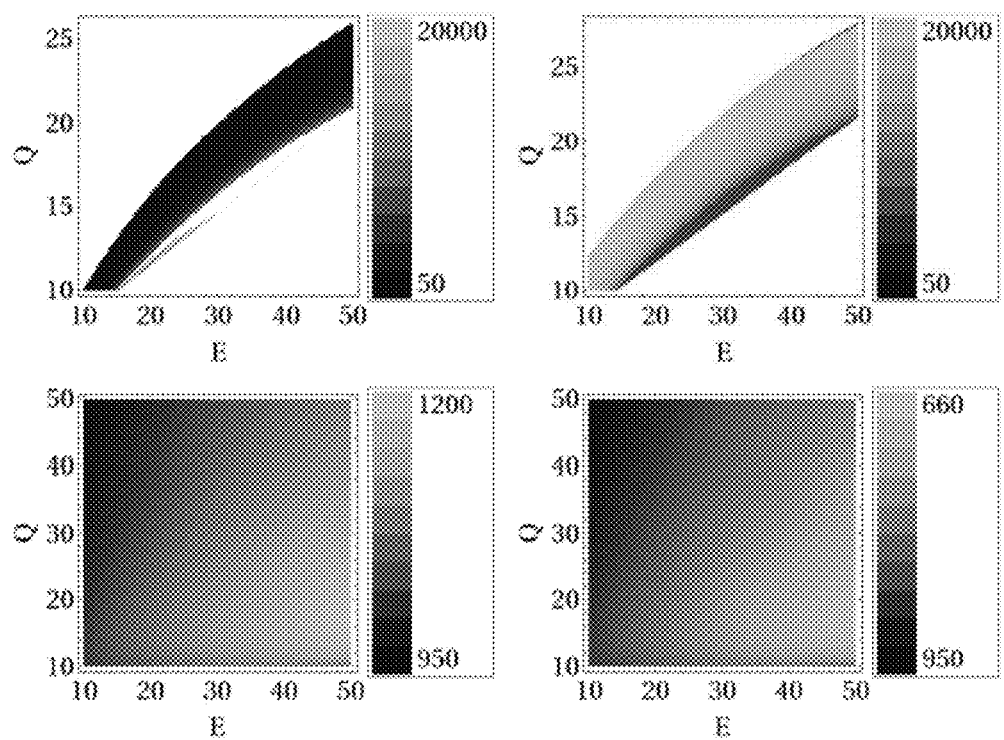
FIG. 10 depicts minimal detonation radius as a function of E and Q.

The regions of Q-E parameter space for which detonation solution exists at a given $M_0$ can be identified. Displayed in FIG. 10 is the minimal radius of detonation as a function of Q and E, for two different inflow Mach numbers, $M_0=1$ and $M_0=2$ at $\gamma=1.2$ and $\gamma=1.4$. Top figures corresponds to $\gamma=1.2$ and bottom figures to $\gamma=1.4$. Left figures correspond to $M_0=1$ and right to $M_0=2$. The radius of the source is $r_0=50$ and $H=1.3H_{min}$. An interesting feature in these figures is that for the larger $\gamma$, the range of existence of solution is much wider and the minimal radius is much smaller than in the case of $\gamma=1.2$.

The radius of the converging detonation can depend on the flow at the source and on the mixture parameters. To find the dependence, the full system of equations (24) can be solved for the range of these parameters. Before solving this problem, some analytical estimates can be done. For example, the flow velocity at some point should equal to the detonation velocity, i.e. $u_{CJ}=D$, for a standing detonation. The detonation velocity, when the detonation radius is large, can be estimated, for example, by the Chapman-Jouguet formula, $$D_{CJ} = \sqrt{\gamma T + \frac{1}{2}Q(\gamma^2-1)} + \sqrt{\frac{1}{2}Q(\gamma^2-1)},$$

where T is the temperature just ahead of the detonation shock. As long as the enthalpy is fixed, the ambient temperature for the adiabatic expansion is a function only of the flow velocity, $$T = \frac{\gamma-1}{\gamma}\left(H - \frac{u^2}{2}\right),$$

and therefore, one can write the following equation for the adiabatic flow velocity at the detonation-shock position:

$$u_{CJ} = \sqrt{(\gamma-1)\left(H - \frac{u_{CJ}^2}{2}\right) + \frac{1}{2}Q(\gamma^2-1)} + \sqrt{\frac{1}{2}Q(\gamma^2-1)} = \frac{\sqrt{2}\left(\sqrt{H_{min}} + \sqrt{H_{min}+H}\right)}{1+\gamma}. \quad (29)$$

This equation can be solved with respect to $u_{CJ}$, and its solution together with equation (25) gives the dependence of the detonation radius on the initial flow velocity, i.e. $r_s(u_0)$. This function decays monotonically: the faster the flow at the source, the earlier it reaches the Chapman-Jouguet velocity $D_{CJ}$. This estimate can give a substantially accurate description of the top branch of the $r_s$-$M_0$ curve.

Two-Dimensional Simulations

Although steady-state solutions exist for a wide range of parameters of the problem, it can be important to understand their stability. Gaseous detonations are often unstable to multi-dimensional perturbations. However, two elements of present configurations can play a role elucidated herein, namely the non-uniform flow upstream of the detonation shock and the curvature of the detonation shock.

Based on the following simple argument, one might conclude that, in fact, the detonation in our configuration should always be unstable even with respect to longitudinal perturbations. Consider a steady radially symmetric detonation standing at some distance from the center, and imagine that it is perturbed inward toward the source by a small distance. Then, because the upstream flow after the perturbation is slower than before the perturbation, and because detonation tends to propagate at a constant speed relative to the flow upstream, the perturbed shock will continue moving inward, which implies instability. In the opposite situation of the detonation shock perturbed outward, the flow upstream of the perturbed shock is faster than before the perturbation. Hence, for the same reason that detonation tends to propagate with a constant speed relative to the upstream state, the perturbed shock will continue expanding, again implying instability.

These simple arguments, however, neglect two important effects that can play a role in the detonation dynamics: the effect of curvature on the detonation speed and the transverse instability leading to the formation of detonation cells. With increasing curvature, the detonation speed can decrease. Thus, when the detonation shock is perturbed, for example inward, its steady-state speed will decrease. Such decrease can be sufficient to compensate for the decreased speed of the upstream flow. Thus, a new steady state is possible once the detonation is perturbed inward. If the curvature effect dominates over the effect of the reduced upstream velocity, the perturbation can in fact decrease resulting in the detonation stability.

The curvature effect can be weak when the detonation radius is large. Much more importantly, two-dimensional instability can set in, giving rise to highly non-trivial multi-dimensional dynamics wherein cellular structures begin to play a dominant role. As discussed below, the two-dimensional evolution of detonation can start with the steady-state solutions that correspond to the square-wave like and regular detonation structures. The radially symmetric solutions are unstable in all cases, however, the nature of instability is different for the two kinds of steady solutions. Both collapsing and expanding solutions can be found, with an important distinction between them given by the time scale of instability, which is much smaller in the collapsing case than in the expanding case.

The expanding detonation can be stabilized by means of several obstacles placed at some distance from the center behind the sonic point. Further, the obstacle-stabilized detonation can be initiated by a supersonic flow obstructed by obstacles. The obstacles can give rise to bow shocks, wherein a detonation is initiated and can establish itself by connecting the individual detonation fronts from the obstacles into a single front surrounding the central source.

For a two-dimensional simulation a solver, such as that developed by Taylor, Kasimov, and Stewart, can be utilized. The solver can use a finite volume method, where fluxes can be calculated, for example, by the WENO algorithm of fifth order and time integration can be done, for example, by the Total Variation Diminishing (TVD) Runge-Kutta method of third order. The spatial domain can be discretized as a uniform Cartesian mesh with resolution at least 20 grid points per half-reaction length of the steady detonation. The Courant-Friedrichs-Lewy (CFL) number can be 0.5. Code can be designed for a distributed parallel architecture, for example, by using a ghost-cell method. At the source inflow boundary conditions can be set, and at the end of the domain the outflow condition can be set by extrapolation of variables. Obstacles can be assumed to be absolutely rigid bodies, and their boundaries can be treated using, for example, the immersed boundary method.

Instability of the Steady-State Circular Detonation

Figure 11A:
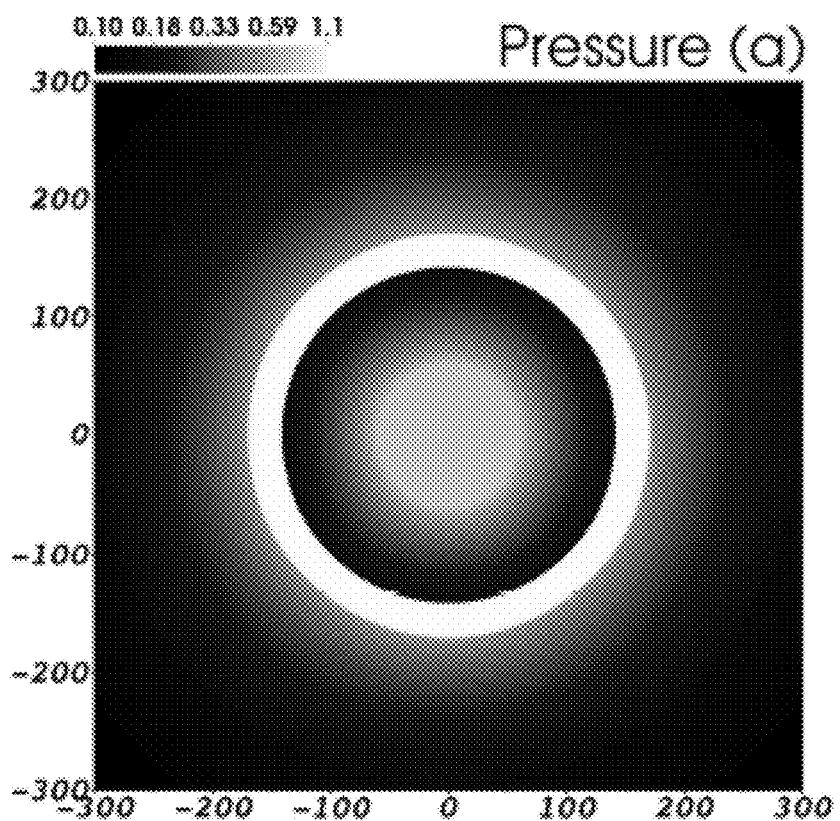
FIGS. 11A-11C depict a collapse of a detonation that starts as a square-wave like steady solution.
Figure 11B:
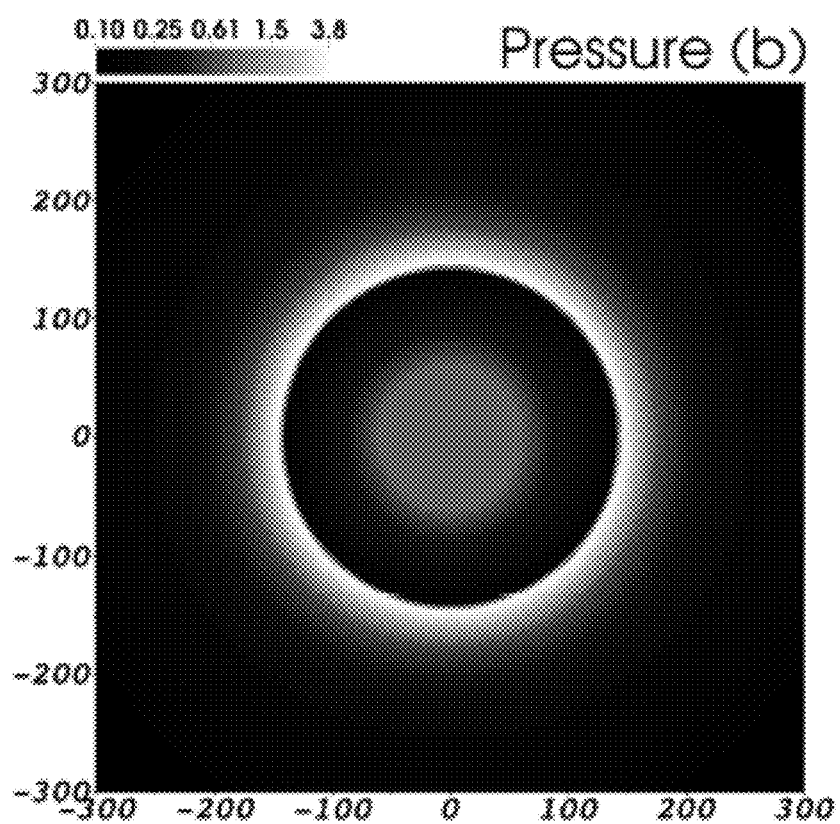
Figure 11C:
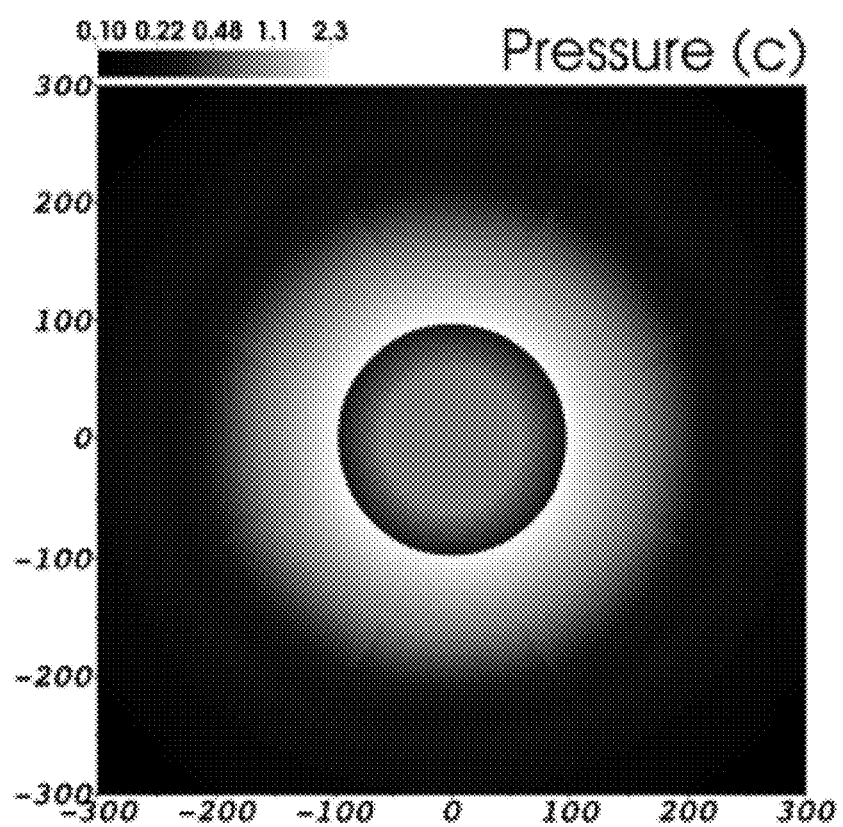

In order to understand the instability of the steady-state solutions, two cases can be analyzed, as shown in FIGS. 8 and 11A-11C. FIGS. 11A-11C show the collapse of the detonation that begins as the square-wave like steady solution shown in FIG. 8. Times of the snapshot from (a) to (c) are, respectively: t=1, 10, and 40. The domain size is 600×600, and the number of grid points is 1280×1280, which corresponds to 64 points per half-reaction zone. The initial radius of detonation is approximately 150. Over the short time of t=40, the radius has decreased to about 100. A careful look at the figures reveals that in fact, the wave has undergone two-dimensional instability and detonation cells appear. However, the cells are weak and do not appreciably change the circular shape of the shock wave. The shock pressure during the collapse increased from about 1.1 at t=0 to 2.3 at t=40. The dynamics remain substantially radially symmetric.

Figure 12A:
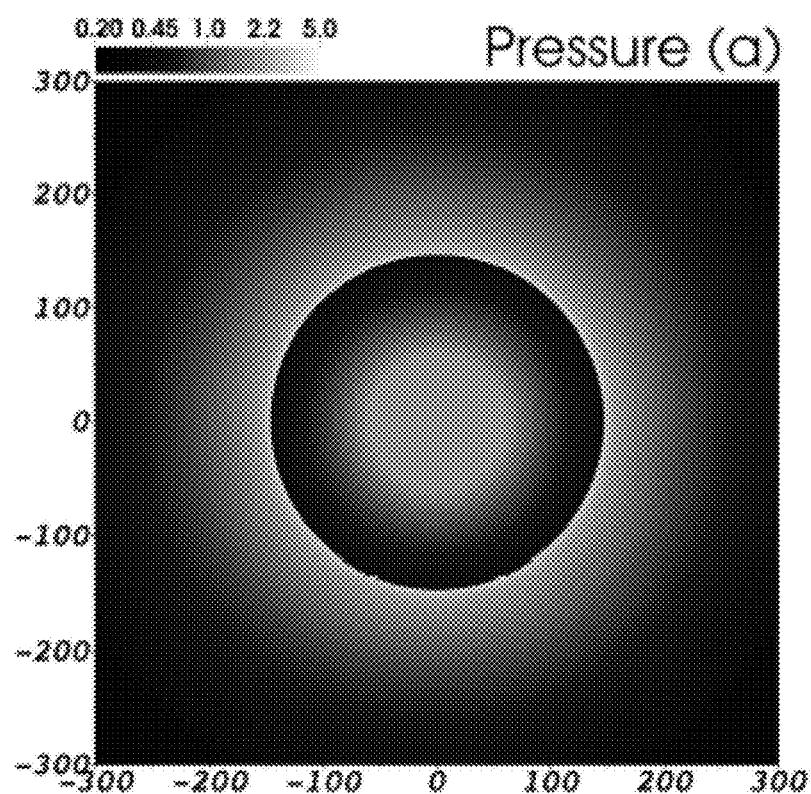
FIGS. 12A-12C depict an expansion of a detonation that starts as a non-square-wave like steady solution.
Figure 12B:
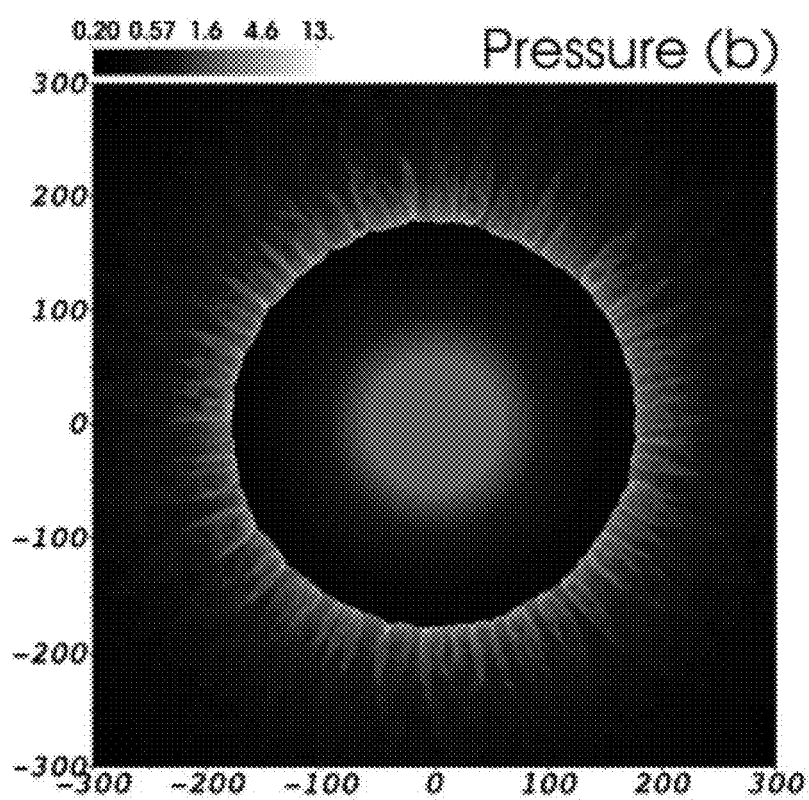
Figure 12C:
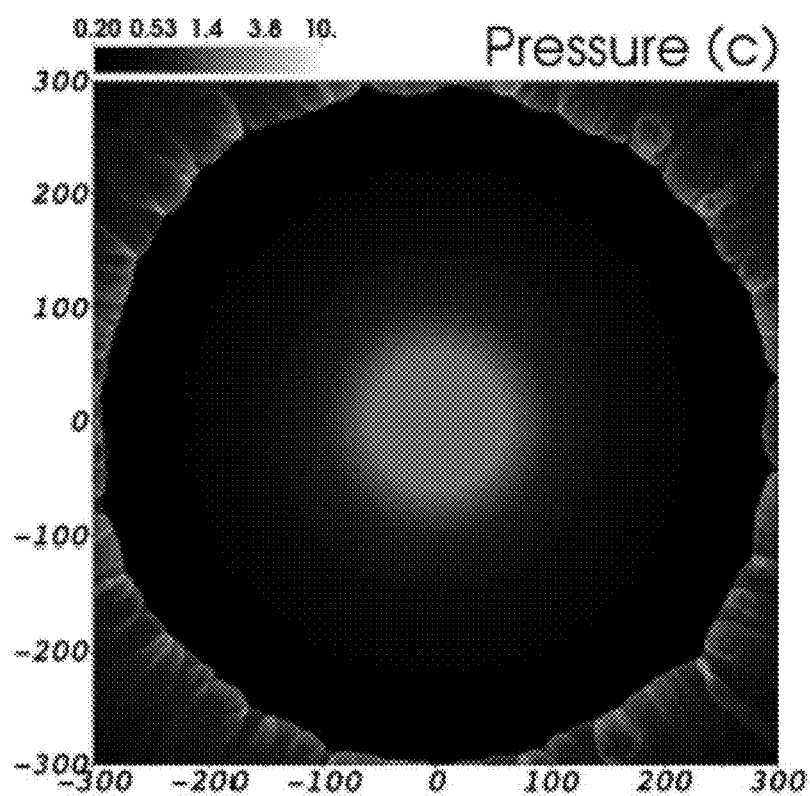

In contrast to the collapsing case, considered above, FIGS. 12A-12C depict an expanding detonation. Expansion of a detonation that starts as a non-square-wave like steady solution (as in FIG. 8) is shown in FIGS. 12A-12C. Times of the snapshot from (a) to (c) are, respectively: t=0, 150, 400. The domain size is 600×600, the number of the grid points is 5120 z 5120, which corresponds to 20 points per half-reaction zone of the steady-state solution. The initial condition is that of FIG. 8 (right column). The initial radius of detonation is nearly the same as in the collapsing case, but the detonation reaction zone structure is very different, with a sharp decrease of pressure behind the lead shock and no visible induction zone. The two-dimensional instability in this particular case is rather strong and quickly results in the onset of strong cellular detonation. The most important distinction of this case from the previous, collapsing one, is that the expansion is significantly slower. It takes about 400 time units for the detonation to expand to twice its initial radius. This slow expansion indicates that it might be possible to prevent the expansion by placing obstacles in the flow downstream the shock that slow down the expanding flow of reaction products.

Figure 13A:
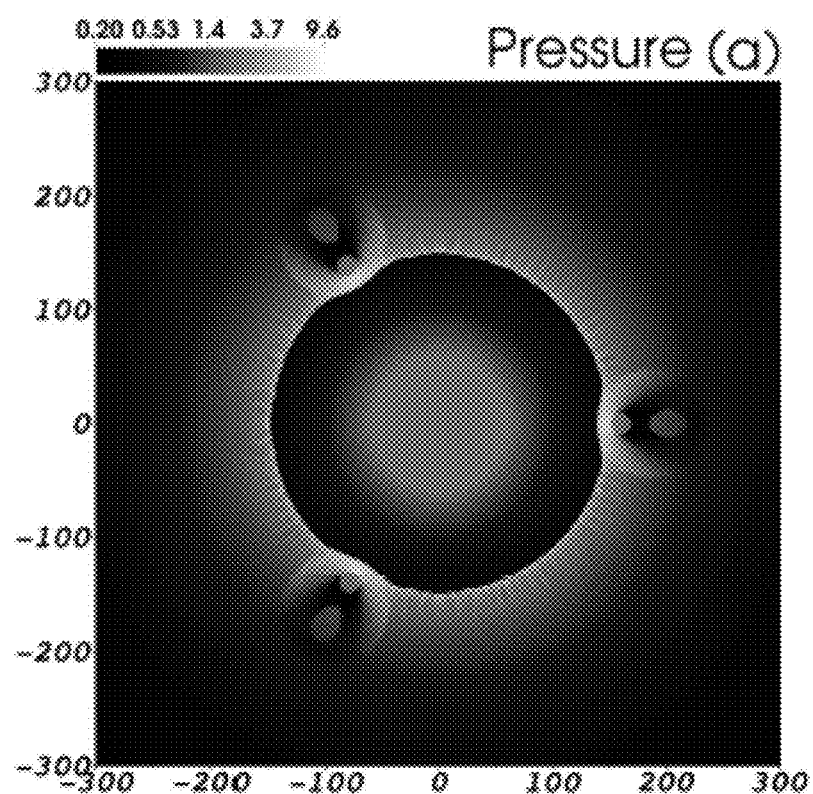
FIGS. 13A-13C depict the stabilization of an expanding detonation.
Figure 13B:
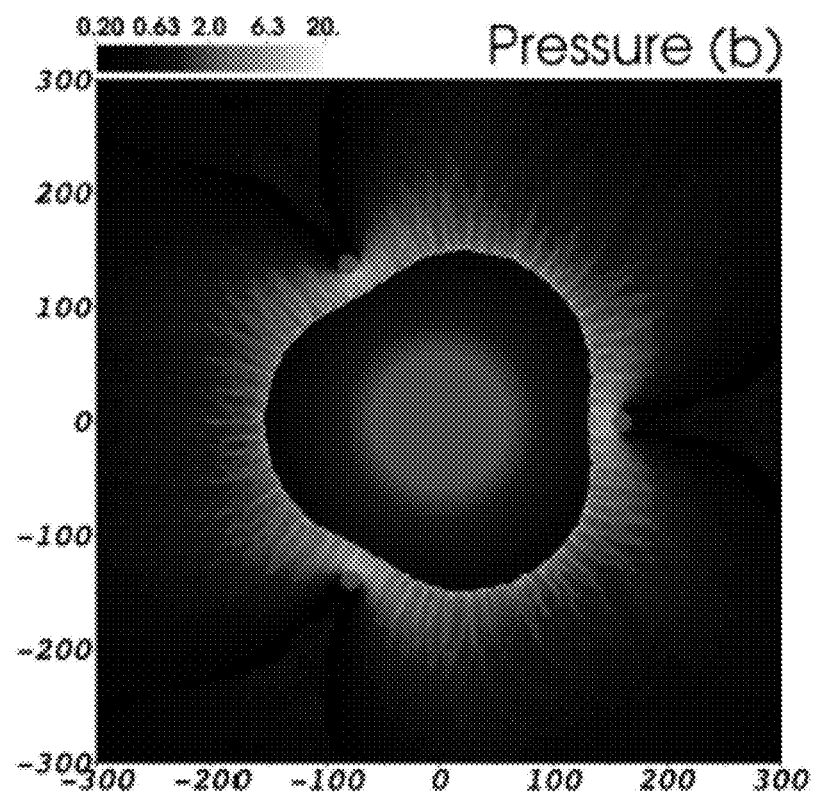
Figure 13C:
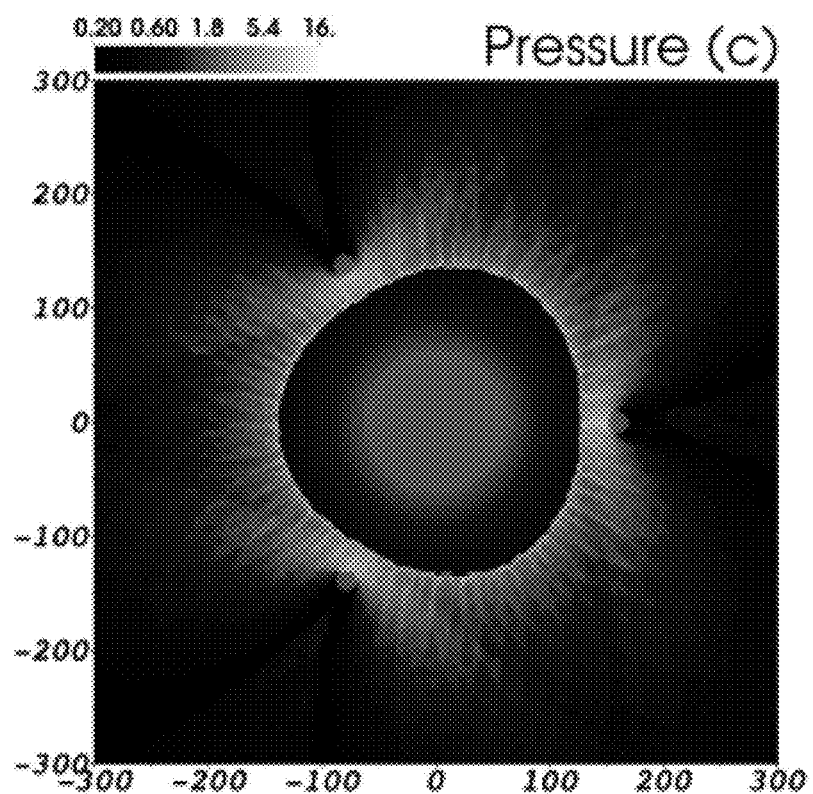

FIGS. 13A-13C show stabilization of expanding detonation of FIGS. 12A-12C by three obstacles of radius 10. Times of the snapshot from FIGS. 12A-12C are, respectively: t=10, 50, and 700. The domain size is 600×600, and the number of the grid points is 2500×2500, which corresponds to 10 points per half-reaction zone of the steady state solution.

Stabilization of Detonation by Obstacles

In order to see if the expanding detonation in the previous section can indeed be stabilized, several obstacles can be placed in the flow just downstream of the steady-state sonic locus. A multitude of possibilities arise, for example, depending on the number, size, and shape of the obstacles. Importantly, however, few obstacles are sufficient to prevent the expansion. The bow shocks that form ahead of the obstacle can slow down the flow of products so that the detonation shock can remain stabilized in the region between the source and the obstacles. The precise position and the shape of the resultant detonation wave can depend on the choice of the obstacles and the details of the mixture as well as source conditions.

As an example, in FIG. 13A, the growth of small bow shocks can form around the obstacles, and the formation of a large triangle-shaped bow shock, in FIG. 13C, can stand downstream of the reaction zone providing stabilizing support for the standing detonation. Using more than three obstacles equally spaced at the same radius, in this particular case, can lead to a collapse of the wave. Whether the solution is collapsing or stabilized can be sensitively dependent on a multitude of parameters that play a role in the phenomenon.

Initiation of Detonation

Calculations can all take a steady state solution as the initial condition for the two-dimensional simulations. Such a calculation can offer understanding of the stability properties of a given steady state solution. Unstable steady state solutions can be difficult to achieve because, for example, such detonations are initiated by a source which can lead, in the unstable case, to pulsating or cellular detonation without going to the steady-state solution. Thus, initiation of the standing detonation in the radial outflow can be important. Different means of doing so can be accomplished, for example, by the detonation initiation from the non-reacting supersonic flow from the source after such flow encounters rigid obstacles.

Figure 14A:
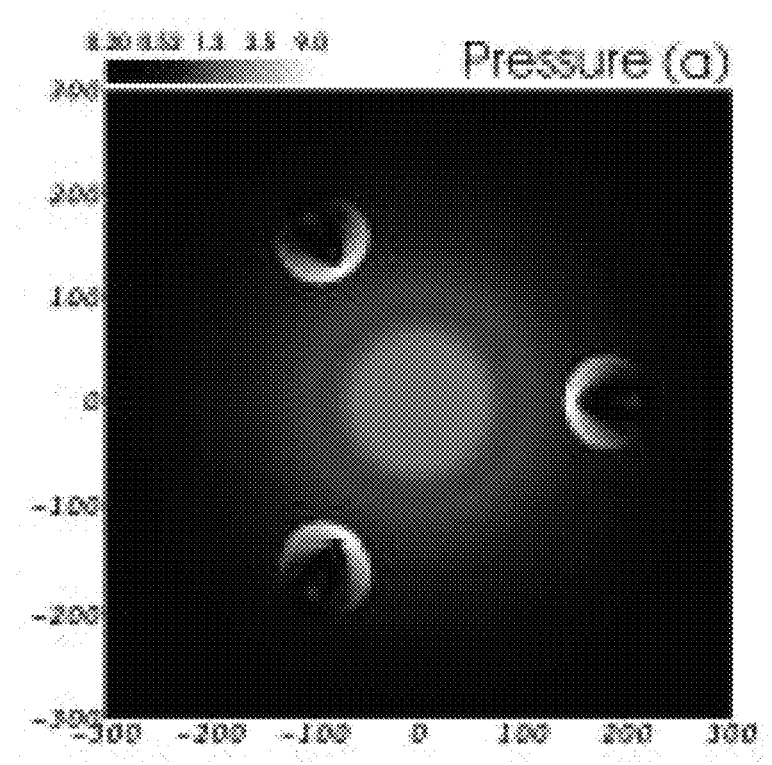
FIGS. 14A-14F depict initiation of a detonation wave in the presence of obstacles.
Figure 14B:
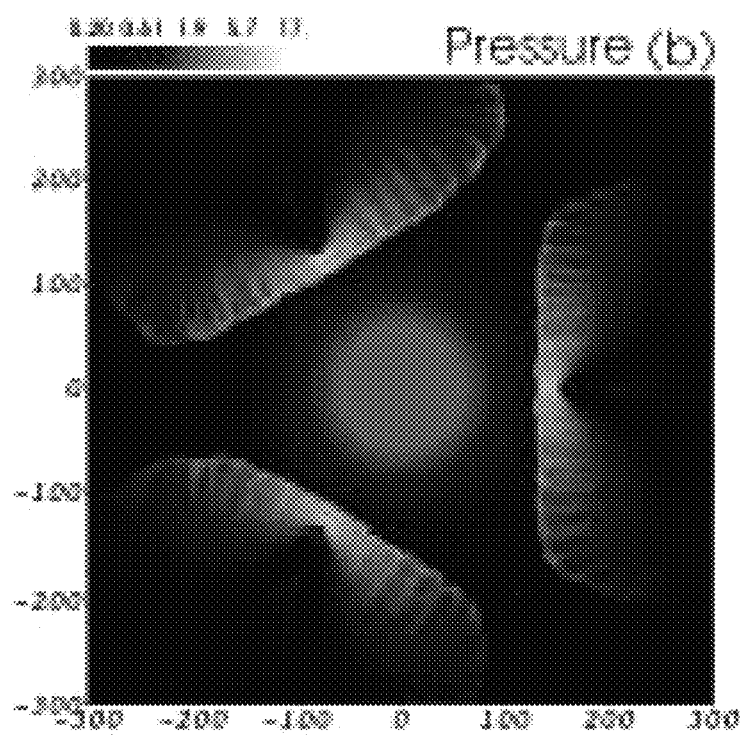
Figure 14C:
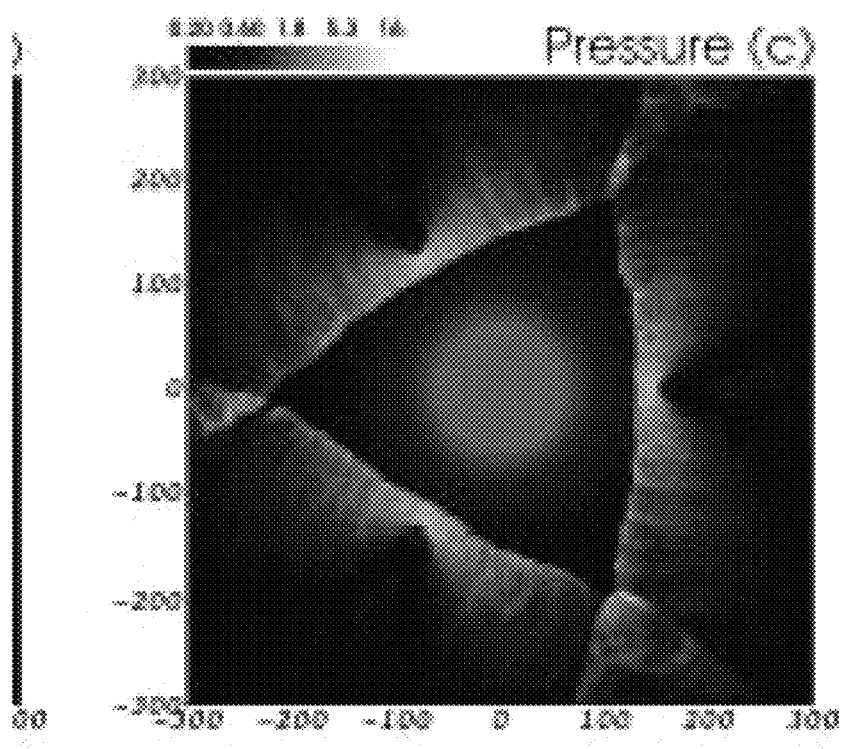
Figure 14D:
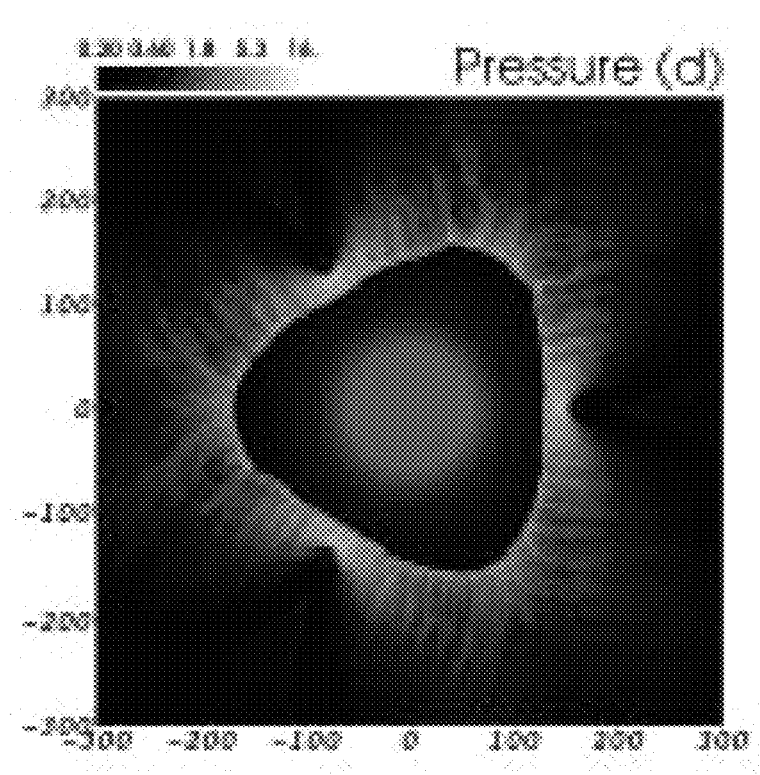
Figure 14E:
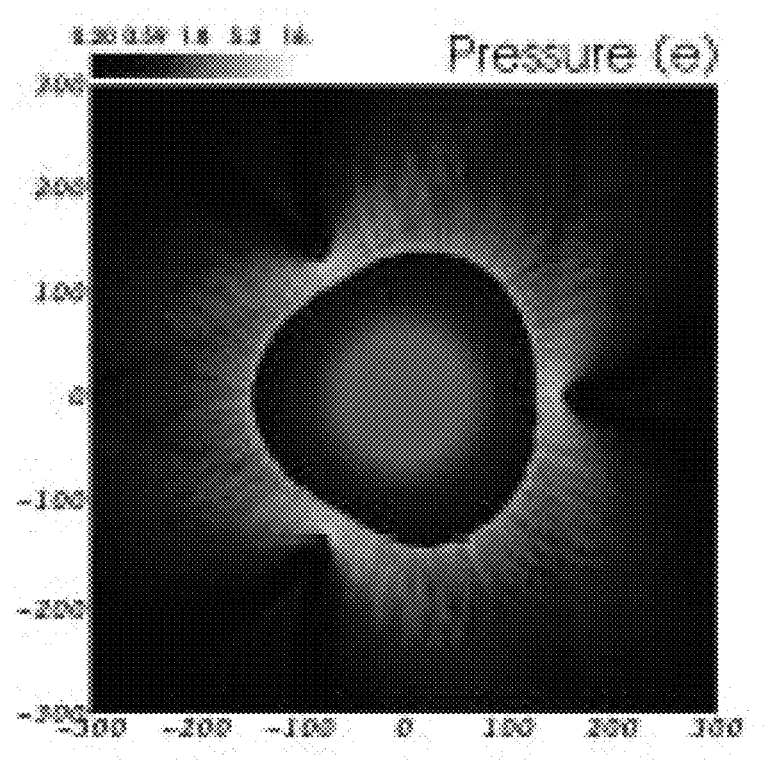
Figure 14F:
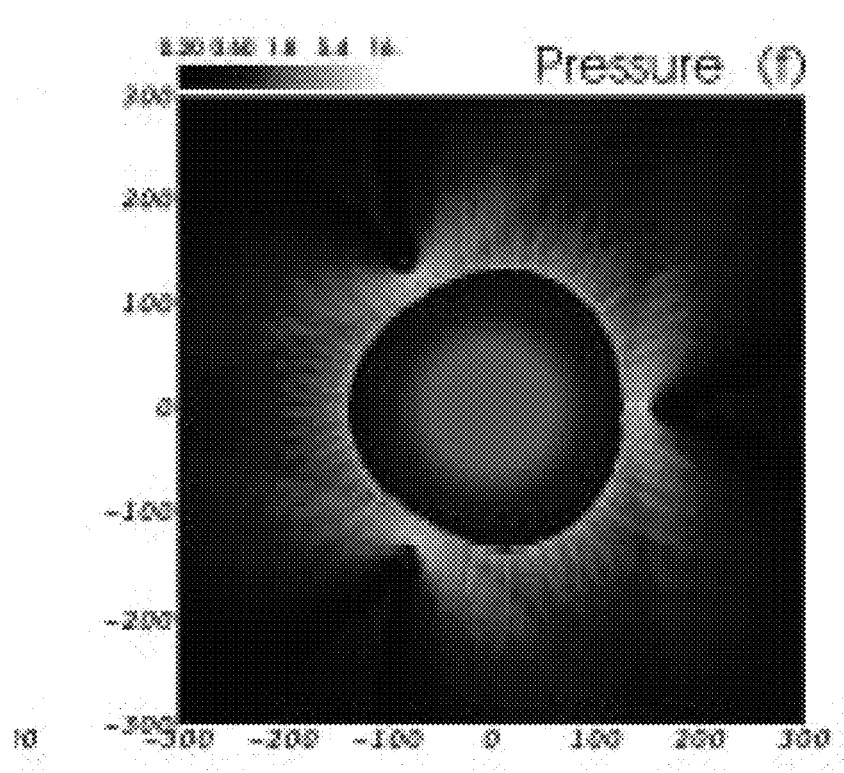

The same obstacles as discussed above can be placed in the flow which is initially non-reacting and adiabatic. FIGS. 14A-14F show initiation of detonation by three obstacles of the same type and position as in FIGS. 13A-13C. Figures correspond to times: (a)—t=10, (b)—t=50, (c)—t=100, (d)—t=200, (e)—t=500, and (f)—t=1500. The domain size is 600×600, the number of the grid points is 2500×2500. Bow-shocks can form in front of the obstacles, as shown in FIG. 14A. Quickly initiating detonation can facilitate stabilization of the waves by the obstacles. However, for some time, these detonation waves are separated from each other forming independent structures, FIG. 14B. Shortly after, the separate detonation fronts merge and reform, FIGS. 14C-14E, into the same final structure shown in FIGS. 14A-14F.

Figure 15A:
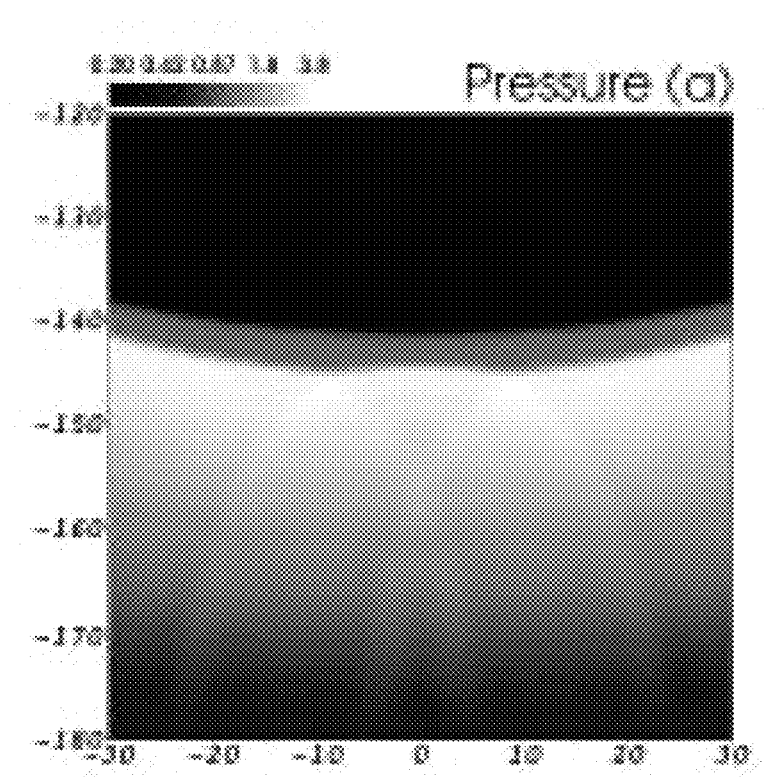
FIGS. 15A-15C depict detailed structure of a reaction zone.
Figure 15B:
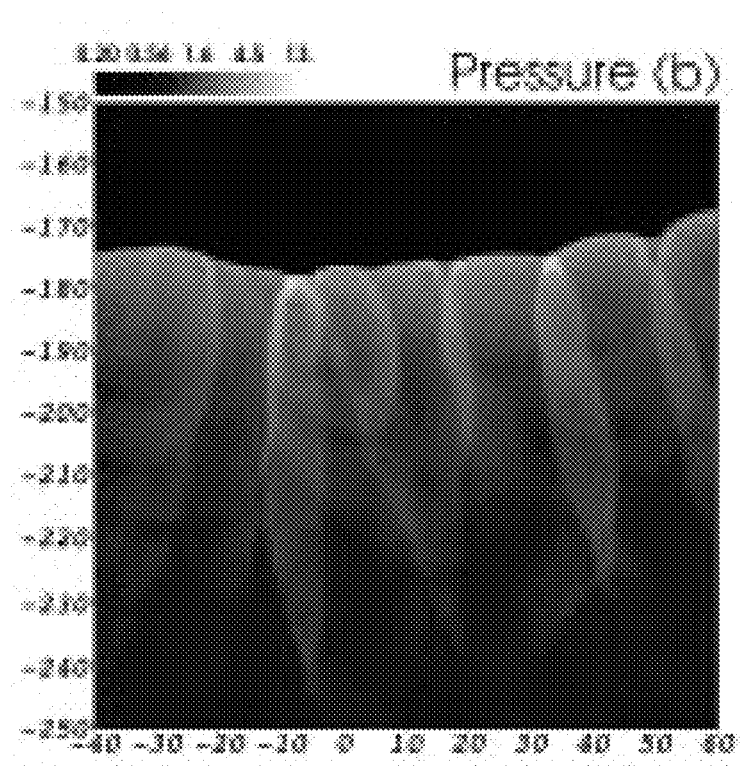
Figure 15C:
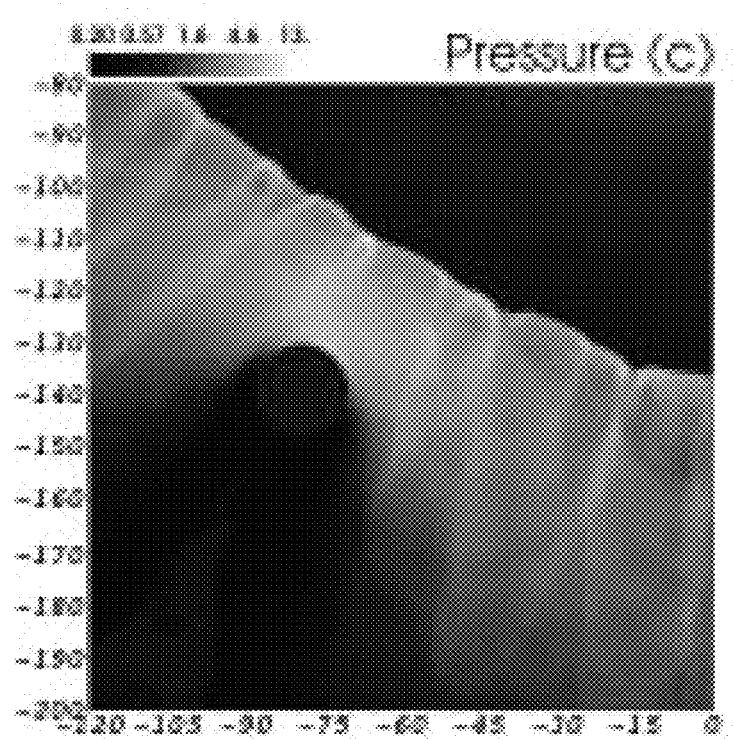

FIGS. 15A-15C show the detailed structure of the reaction zones of FIGS. 11A-13C. FIG. 15A—collapsing t=10—corresponds to the case in FIG. 11C. FIG. 15B—expanding t=150—corresponds to the case in FIG. 12B. FIG. 15C—detonation stabilized by obstacles t=700—corresponds to the case in FIG. 13C.

An exemplary detonation engine 100 can include a first inlet 135 for delivering an oxidizer to the engine and a second inlet 140 for delivering fuel to the engine. The first inlet 135 can be fluidly connected to a first tank (not shown) containing the oxidizer, and the second inlet 140 can be fluidly connected to a second tank (not shown) containing fuel. In one example, the first and second inlets (135, 140) can be positioned on opposite sides of the engine as shown in FIG. 1. Consequently, the fluid and oxidizer can be delivered to the engine 100 in opposing directions along a common axis 145. The first inlet 135 can include a first nozzle 105 and the second inlet 140 can include a second nozzle 110. As the oxidizer flows through the first nozzle 105, supersonic flow can be attained within the engine 100. Similarly, as the fuel flows through the second nozzle 110, supersonic flow can be attained within the engine 100.

The exemplary detonation engine 100 can include a separator 115 positioned between the first and second inlets (135, 140) and along the common axis 145. A first side of the separator 115 can diffuse a first flow of oxidizer radially outward from the common axis 145. Likewise, a second side of the separator 115 can diffuse a second flow of fuel radially outward from the common axis 145. As the first and second flows travel radially outward from the common axis 145, the flows eventually travel beyond an outer perimeter of the separator 115. At this point, the first and second flows begin mixing. Mixing of the flows occurs over a certain time and distance, and the mixed flow becomes more homogeneous as it moves outwardly from the common axis 145. When a sufficient mixing has taken place, detonation of the mixture can occur.

Figure 2:
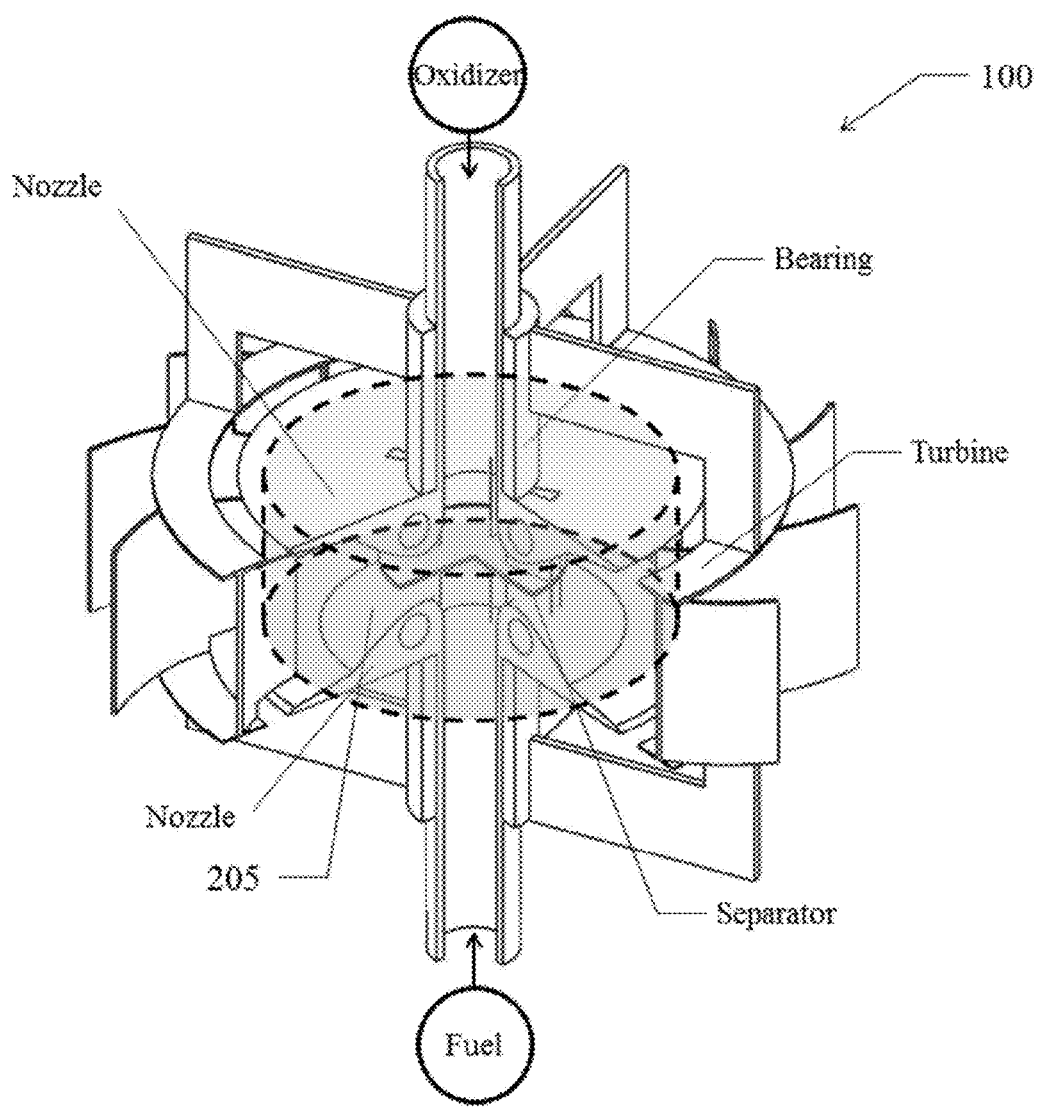
FIG. 2 is a cross-sectional view of a detonation engine showing an example cylindrical detonation region.

Detonation can be initiated under a wide range of initial pressure conditions, but certain temperatures and ranges of chemical composition should generally be kept to avoid quenching. Temperatures on the order of 1000K and pressures of 30-40 bars are typical at the shocks in gaseous detonations, while 2500-3000K and 20-30 bars are typical in detonation products. Preferred ranges for these parameters can depend on specific design conditions and desired results. Due to the geometry of the detonation engine 100, suitable conditions for detonation are present only at certain distances from the common axis 145. Consequently, detonation can occur within a detonation region 205 having a cylindrical geometry, as shown in FIG. 2. The detonation region 205 will include a standing detonation wave.

A typical detonation region can have a thin shock followed by a reaction zone, whose extent can strongly depend on mixture composition and on combustion conditions. A reaction zone typically can be from a fraction of a millimeter to several millimeters or more. Such fast combustion can be advantageous in terms of minimizing the effects of geometric and loss factors on the combustion process, provided the size of the device significantly exceeds these scales. As the mixture passes through the detonation region 205, detonation occurs, and heat is released as the mixture converts to combustion products. The hot combustion products continue traveling radially outward from the detonation region 205 and common axis 145 and pass through and rotate a turbine 120, thereby producing useful work. As the combustion products pass through the turbine, energy can be extracted from the combustion products, causing their temperatures and pressures to decrease.

The turbine 120 can be configured to freely rotate independent of the engine. In one example, the turbine can be mounted on a first and second bearing (125, 130) attached to the first and second inlets (135, 140), respectively, as shown in FIG. 1. Alternately, the turbine 120 can rotate upon one bearing or more than two bearings. In another example, the turbine 120 can be non-integral to the engine 100. For instance, the turbine 120 can be mounted in an exhaust pipe extending from the engine 100, as is common in automotive applications. Although a turbine 120 is shown and described, this is not limiting; any analogous component for generating work from combustion products with elevated temperatures and pressures can be substituted.

To achieve a standing detonation wave, the oxidizer and fuel can be delivered to the detonation region 205 at a velocity equal to the velocity of the resultant detonation wave. As an example, if the detonation wave would otherwise propagate at a rate of 2 km/sec at the temperature and pressure found within the detonation engine 100, then the fuel and oxidizer should be delivered to the detonation region 205 at a rate of 2 km/sec to yield a standing detonation wave in the detonation region 205. In one example, the oxidizer can exit the first nozzle 105 at a supersonic velocity of about 2 km/sec, and fuel can exit the second nozzle 110 at supersonic velocity of about 2 km/sec.

Figure 3:
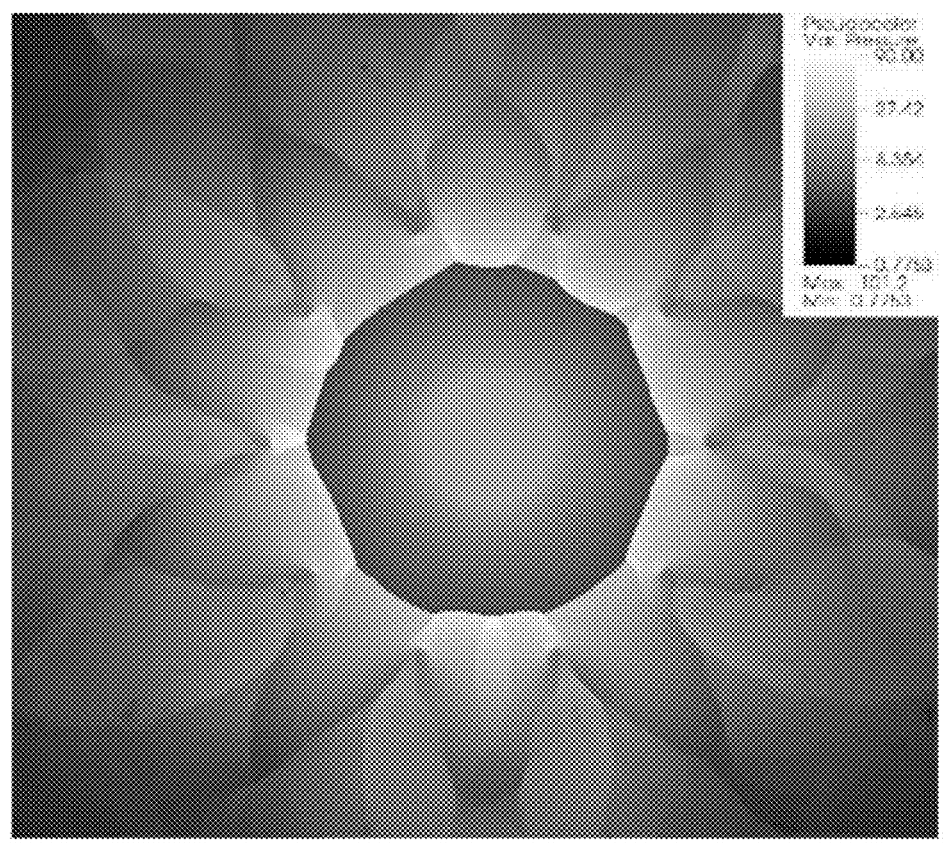
FIG. 3 is a simulated standing wave in a detonation expressed in terms of pressure.
Figure 4:
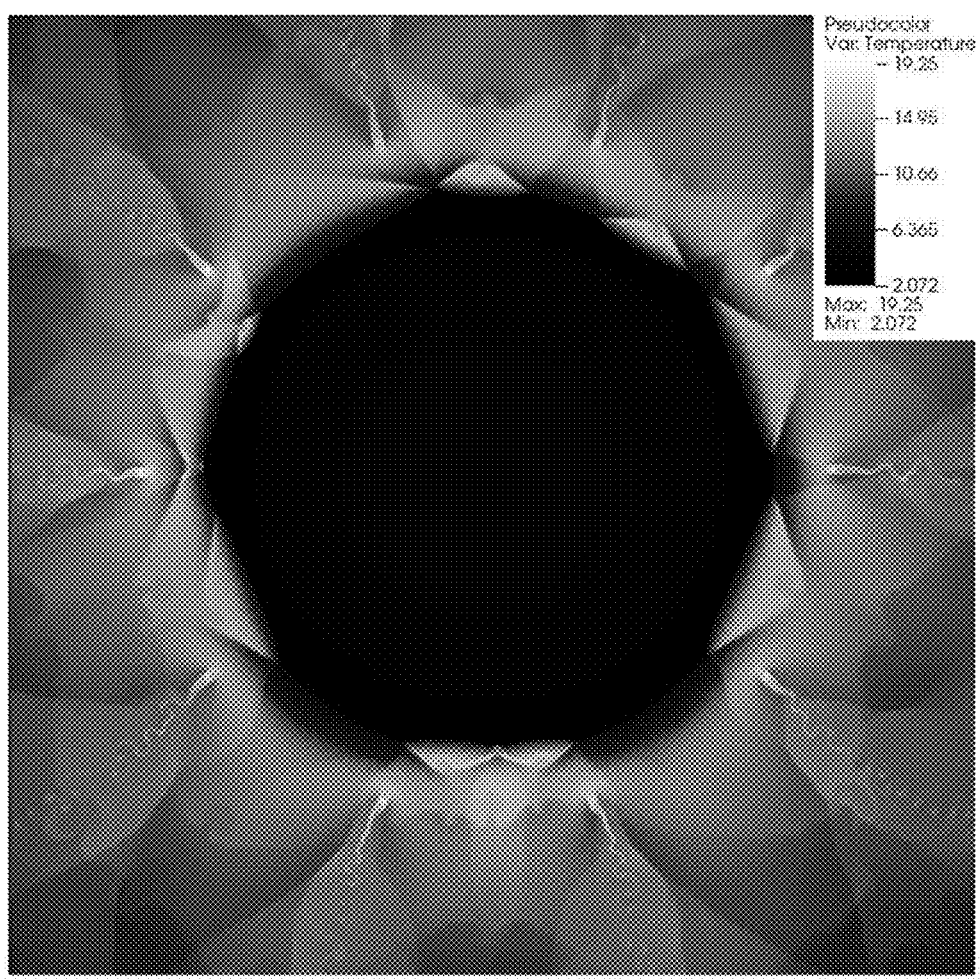
FIG. 4 is a simulated standing wave in a detonation expressed in terms of temperature.

FIGS. 3 and 4 are exemplary computational models showing stabilized detonation waves expressed in terms of pressure or temperature. These models were based on calculations for an ideal-gas representative of a stoichiometric hydrogen-oxygen mixture diluted with 70% helium, emanating at a supersonic speed from a source of diameter 10 (in units of the thickness of the reaction zone in steady planar detonation). The gas expands initially without chemical reactions and accelerates until it runs into a detonation shock, after which it starts burning. The combustion process is non-uniform and leads to a characteristic multi-dimensional reaction zone with transverse shock waves propagating along the main shock, as shown in the two figures. FIG. 3 shows the pressure field in bars. The pressure, which initially decreases during the expansion from the source, undergoes a significant rise across the detonation shock, and decreases subsequently in the outer regions of the flow as the burnt gases are ejected radially at high speed. FIG. 4 shows flow temperature in units of 395K.

In an exemplary detonation engine combustion products can interact with rotating blades. This interaction can accomplish several things. It can provide the necessary thrust to produce useful work. The interaction can stabilize the detonation reaction zone by reducing radial expansion. The detonation can be stabilized by putting obstacles in the flow behind the detonation shock. To simulate this stabilization effect of the rotating blades, a number of small rigid circular obstacles can be placed along a ring of a certain radius. These obstacles can be clearly seen in the temperature plot as small white spots where streaks of vortices shedding from the obstacles are seen, in other words, at the heads of the vortex streets. In an exemplary embodiment, rotating blades with a different geometry than in the figures can achieve this stabilization within an engine. Such blades could provide both a means for transforming kinetic energy of a detonation into mechanical energy of the engine and a means for stabilizing the detonation. The obstacle position can affect the steady-state circular-detonation radius, but the detonation wave can be prevented from unbounded expansion by the presence of these obstacles. A stable detonative combustion can be achieved in this geometry and other geometries.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

REFERENCES

The following are hereby incorporated by reference in their entirety.

F. A. Bykovskii, S. A. Zhdan, and E. F. Vedernikov. Continuous spin detonations. Journal of Propulsion and Power, 22(6):1204-1216, 2006.

F. A. Bykovskii, V. V. Mitrofanov, and E. F. Vedernikov. Continuous detonation combustion of fuel-air mixtures. Combustion, Explosion and Shock Waves, 33(3):344-353, 1997.

A. Dadone. Symmetry techniques for the numerical solution of the 2D Euler equations at impermeable boundaries. International Journal for Numerical Methods in Fluids, 28(7):1093-1108, 1998.

W. Döring. Uber den detonationvorgang in gasen. Annalen der Physik, 43(6/7):421-428, 1943. W. Fickett and W. C. Davis. Detonation: theory and experiment. Dover Publications, 2011.

S. Gottlieb and C. W. Shu. Total variation diminishing runge-kutta schemes. Mathematics of Computation, 67(221):73-85, 1998.

K. Kailasanath. Review of propulsion applications of detonation waves. AIAA journal, 38(9):1698-1708, 2000.

J. H. S. Lee. The Detonation Phenomenon. Cambridge University Press, 2008.

X.-D. Liu, S. Osher, and T. Chan. Weighted essentially non-oscillatory schemes. Journal of Computational Physics, 115(1):200-212, 1994.

J. A. Nicholls and E. K. Dabora. Recent results on standing detonation waves. In Symposium (International) on Combustion, volume 8, pages 644-655. Elsevier, 1961.

G. D. Roy, S. M. Frolov, A. A. Borisov, and D. W. Netzer. Pulse detonation propulsion: challenges, current status, and future prospects. Progress in Energy and Combustion Science, 30(6):545-672, 2004.

P. M. Rubins and R. C. Bauer. Review of shock-induced supersonic combustion research and hypersonic applications. Journal of Propulsion and Power, 10(5):593-601, 1994.

R. I. Soloukhin Shock waves and detonations in gases. Mono Book Corporation, 1966.

B. D. Taylor, A. R. Kasimov, and D. S. Stewart. Mode selection in unstable two-dimensional detonations. Combust. Theory Model, 13(6):973-992, 2009.

A. A. Vasil'ev, V. I. Zvegintsev, and D. G. Nalivaichenko. Detonation waves in a reactive supersonic flow. Combustion, Explosion and Shock Waves, 42(5):568-581, 2006.

B. V. Voitsekhovskii, V. V. Mitrofanov, and M. Y. Topchian. The Structure of Detonation Front in Gases. Report FTD-MTD-64-527. Foreign Technology Division, Wright Patterson Air Force Base, OH (AD 633-821)., 1966.

J. von Neumann. Theory of detonation waves. Office of Scientific Research and Development, Report 549. Technical report, National Defense Research Committee Div. B, 1942.

P. Wolanski. Detonative propulsion. Proceedings of the Combustion Institute, 2012.

Y. B. Zel'dovich. On the theory of propagation of detonation in gaseous systems. J. Exp. Theor. Phys., 10(5):542-569, 1940.

F. Zhang, editor. Shock Waves Science and Technology Library, Vol. 6: Detonation Dynamics, volume 6. Springer, 2012.

T. A. Zhurayskaya and V. A. Levin. Investigation of certain techniques for stabilizing detonation waves in a supersonic flow. Fluid Dynamics, 47(6):793-801, 2012.

What is claimed is:

1. A method for detonating a mixture of fuel and oxidizer, the method comprising:
   introducing an oxidizer to a detonation engine through a first inlet;
   introducing a fuel to the detonation engine through a second inlet, wherein the first and second inlets are collinear with a common axis;
   accelerating the oxidizer through a first nozzle;
   accelerating the fuel through a second nozzle;
   directing the oxidizer against a first side of a separator and radially outward from the common axis;
   directing the fuel against a second side of the separator, the second side being opposite the first side, and radially outward from the common axis;
   detonating the mixture of the fuel and the oxidizer at a distance from the common axis, within a cylindrical detonation region, to produce combustion products; and
   passing the combustion products over a turbine to rotate the turbine,
   wherein the turbine is mounted with first and second bearings attached to the first and second inlets, respectively.

2. The method of claim 1, wherein the first inlet has a first end fluidly connected to a first tank and a second end fluidly connected to the detonation engine.

3. The method of claim 2, wherein the second inlet has a first end fluidly connected to a second tank and a second end fluidly connected to the detonation engine.

4. The method of claim 1 or 3, wherein accelerating the oxidizer through the first nozzle produces supersonic flow, and wherein accelerating the fuel through the second nozzle produces supersonic flow.

5. The method of claim 4, further comprising: expanding the combustion products resulting from detonating the mixture through the turbine to produce work.

6. The method of claim 1, further comprising: providing obstacles to inhibit expansion of the combustion products.

7. The method of claim 1, further comprising: stabilizing detonation of the mixture in the detonation engine.

8. The method of claim 7, wherein obstacles are configured in the detonation engine to achieve stabilization of the detonation.

9. The method of claim 1, further comprising: stabilizing a detonation of the engine to obtain a resultant standing detonation wave by delivering the oxidizer and the fuel to the detonation region with a speed equal to a speed of the resultant standing detonation wave.

10. A method for detonating a mixture of fuel and oxidizer, the method comprising:
    introducing an oxidizer to a detonation engine through a first inlet that is rotatably attached to a first bearing;
    introducing a fuel to the detonation engine through a second inlet that is rotatably attached to a second bearing, wherein the first and second inlets are collinear with a common axis;
    accelerating the oxidizer through a first nozzle;
    accelerating the fuel through a second nozzle;
    directing the oxidizer against a first side of a separator and radially outward from the common axis;
    directing the fuel against a second side of the separator, the second side being opposite the first side, and radially outward from the common axis;
    detonating the mixture of the fuel and the oxidizer at a distance from the common axis within a cylindrical detonation region, to produce combustion products; and
    passing the combustion products over a turbine to rotate the turbine,
    wherein the turbine is attached to the first and second bearings.

11. The method of claim 10, wherein accelerating the oxidizer through the first nozzle produces supersonic flow, and wherein accelerating the fuel through the second nozzle produces supersonic flow.

12. The method of claim 11, further comprising: expanding the combustion products resulting from detonating the mixture through the turbine to produce work.

13. The method of claim 10, further comprising: providing obstacles to inhibit expansion of the combustion products, wherein the obstacles are configured in the detonation engine to achieve stabilization of the detonation.

14. The method of claim 10, further comprising: stabilizing a detonation of the engine to obtain a resultant standing detonation wave by delivering the oxidizer and the fuel to the detonation region with a speed equal to a speed of the resultant standing detonation wave.

15. A method for detonating a mixture of fuel and oxidizer, the method comprising:
    introducing an oxidizer to a detonation engine through a first inlet;
    introducing a fuel to the detonation engine through a second inlet, wherein the first and second inlets are collinear with a common axis;
    accelerating the oxidizer through a first nozzle;
    accelerating the fuel through a second nozzle;
    directing the oxidizer against a first side of a separator and radially outward from the common axis;
    directing the fuel against a second side of the separator, the second side being opposite the first side, and radially outward from the common axis; and
    detonating the mixture of the fuel and the oxidizer at a distance from the common axis, within a cylindrical detonation region, to produce a standing detonation wave.

* * * * *